US012735073B2

(12) United States Patent
Yamazaki

(10) Patent No.: US 12,735,073 B2
(45) Date of Patent: Sep. 15, 2026

(54) DRIVING ASSISTANCE DEVICE AND DRIVING ASSISTANCE METHOD

(71) Applicant: HONDA MOTOR CO., LTD., Tokyo (JP)

(72) Inventor: Taku Yamazaki, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 50 days.

(21) Appl. No.: 18/896,849

(22) Filed: Sep. 25, 2024

(65) Prior Publication Data

US 2025/0108840 A1 Apr. 3, 2025

(30) Foreign Application Priority Data

Sep. 29, 2023 (JP) ................................ 2023-170825
Feb. 21, 2024 (JP) ................................ 2024-024775

(51) Int. Cl.
*B60W 60/00* (2020.01)
*B60W 30/095* (2012.01)
(Continued)

(52) U.S. Cl.
CPC .... *B60W 60/0027* (2020.02); *B60W 30/0953* (2013.01); *B60W 30/0956* (2013.01);
(Continued)

(58) Field of Classification Search
CPC ......... B60W 60/0027; B60W 30/0953; B60W 30/0956; B60W 50/0097; B60W 50/14;
(Continued)

(56) References Cited

U.S. PATENT DOCUMENTS 6,076,040 A * 6/2000 Akutsu .................... G08G 1/01 701/518
8,520,695 B1 8/2013 Rubin et al.
(Continued)

FOREIGN PATENT DOCUMENTS

JP 2010-188981 A 9/2010
JP 2017-091502 A 5/2017
(Continued)

OTHER PUBLICATIONS

Japanese Office Action for Japanese Patent Application No. 2024-024775 mailed Sep. 1, 2025 (partially translated).
(Continued)

*Primary Examiner* — Donald J Wallace
*Assistant Examiner* — Jalal C Coduroglu
(74) *Attorney, Agent, or Firm* — THOMAS | HORSTEMEYER, LLP

(57) ABSTRACT

A driving assistance device acquires peripheral vehicle information from a peripheral vehicle and predicts a collision possibility based on self-vehicle information and the peripheral vehicle information. In a case where the peripheral vehicle exists within a first range in front of the self-vehicle, a first determination region is set using a position where the self-vehicle accelerates after decelerating to a threshold value or less or a position where the self-vehicle temporarily stops, and a collision possibility in the first determination region is predicted. In a case where the peripheral vehicle exists within a second range on a side of the self-vehicle, a second determination region is set using an intersection between a predicted course of the self-vehicle and a predicted course of the peripheral vehicle, and a collision possibility in the second determination region is predicted.

8 Claims, 11 Drawing Sheets

(51) Int. Cl.
*B60W 50/00* (2006.01)
*B60W 50/14* (2020.01)

(52) U.S. Cl.
CPC ........ *B60W 50/0097* (2013.01); *B60W 50/14* (2013.01); *B60W 2554/4041* (2020.02); *B60W 2554/4042* (2020.02); *B60W 2556/65* (2020.02); *B60W 2756/10* (2020.02)

(58) Field of Classification Search
CPC . B60W 2554/4041; B60W 2554/4042; B60W 2556/65; B60W 2756/10; B60W 30/09; G08G 1/096827; G08G 1/096844; G08G 1/0969; G08G 1/161
See application file for complete search history.

(56) References Cited

U.S. PATENT DOCUMENTS

| | | | | |
|---|---|---|---|---|
| 9,830,822 | B2 | 11/2017 | Ando et al. | |
| 11,100,804 | B2 | 8/2021 | Kurehashi | |
| 11,724,713 | B2 | 8/2023 | Nomura | |
| 11,760,345 | B2 | 9/2023 | Kozono et al. | |
| 11,772,653 | B2 | 10/2023 | Yu | |
| 2010/0217483 | A1 | 8/2010 | Matsuno | |
| 2015/0274162 | A1 | 10/2015 | Sato | |
| 2016/0152264 | A1* | 6/2016 | Watanabe | B62D 15/0295 701/41 |
| 2017/0072852 | A1 | 3/2017 | Matsuoka et al. | |
| 2018/0046193 | A1* | 2/2018 | Takada | G05D 1/0276 |
| 2018/0208195 | A1 | 7/2018 | Hutcheson et al. | |
| 2019/0287406 | A1 | 9/2019 | Kurehashi | |
| 2019/0315343 | A1 | 10/2019 | Steffey et al. | |
| 2019/0385456 | A1 | 12/2019 | Yoshida | |
| 2020/0183002 | A1 | 6/2020 | Lee et al. | |
| 2020/0239020 | A1 | 7/2020 | Aoki | |
| 2020/0257308 | A1* | 8/2020 | Herman | G05D 1/0231 |
| 2020/0298879 | A1 | 9/2020 | Nomura | |
| 2021/0004024 | A1 | 1/2021 | Whitfield, Jr. et al. | |
| 2022/0105927 | A1 | 4/2022 | Kozono et al. | |
| 2022/0135039 | A1* | 5/2022 | Jardine | B60W 30/18163 701/26 |
| 2022/0289178 | A1 | 9/2022 | Hagiwara et al. | |
| 2022/0297687 | A1 | 9/2022 | Yamazaki | |
| 2023/0192192 | A1* | 6/2023 | Morita | B60W 30/09 |
| 2024/0149921 | A1* | 5/2024 | Jeong | B60W 30/0953 |
| 2025/0108791 | A1* | 4/2025 | Yamazaki | B60W 30/09 |

FOREIGN PATENT DOCUMENTS

| | | | |
|---|---|---|---|
| JP | 2019-105684 | A | 6/2019 |
| JP | 2021-105908 | A | 7/2021 |
| JP | 2022-061482 | A | 4/2022 |
| JP | 7054636 | B2 | 4/2022 |
| JP | 2022-071393 | A | 5/2022 |

OTHER PUBLICATIONS

Japanese Office Action for Japanese Patent Application No. 2024-024771 mailed Sep. 1, 2025 (partially translated).
File history of related U.S. Appl. No. 18/891,877, filed Sep. 20, 2024 and the specification and drawings of the same.
Non-Final OA for U.S. Appl. No. 18/891,877 dated Feb. 24, 2026.

* cited by examiner

100
VEHICLE
106
CONTROL DEVICE
110
PROCESSING UNIT
101
SENSOR GROUP
ACQUISITION UNIT
110a
102
GNSS ANTENNA
113
GNSS MODULE
PREDICTION UNIT
110b
ASSISTANCE UNIT
110c
UPDATE UNIT
110d
104
NOTIFICATION DEVICE
BRAKING DEVICE
105
VEHICLE-TO-VEHICLE COMMUNICATION ANTENNA
103
VEHICLE-TO-VEHICLE COMMUNICATION MODULE
114
111
STORAGE UNIT
112
RISK POSITION INFORMATION

| RISK POSITION ID | REGISTRATION DATE AND TIME | COORDINATES | PASSING DIRECTION |
| --- | --- | --- | --- |
| 0001 | 2022/09/aa | P1(X1, Y1) | 21° |
| 0002 | 2022/09/bb | P2(X2, Y2) | 285° |
| 0003 | 2022/10/cc | P3(X3, Y3) | 53° |
| 0004 | 2022/11/dd | P4(X4, Y4) | 92° |
| ⋮ | | | |
| nnnn | 2023/08/ee | Pn(Xn, Yn) | 165° |
| ⋮ | | | |

F I G. 3B
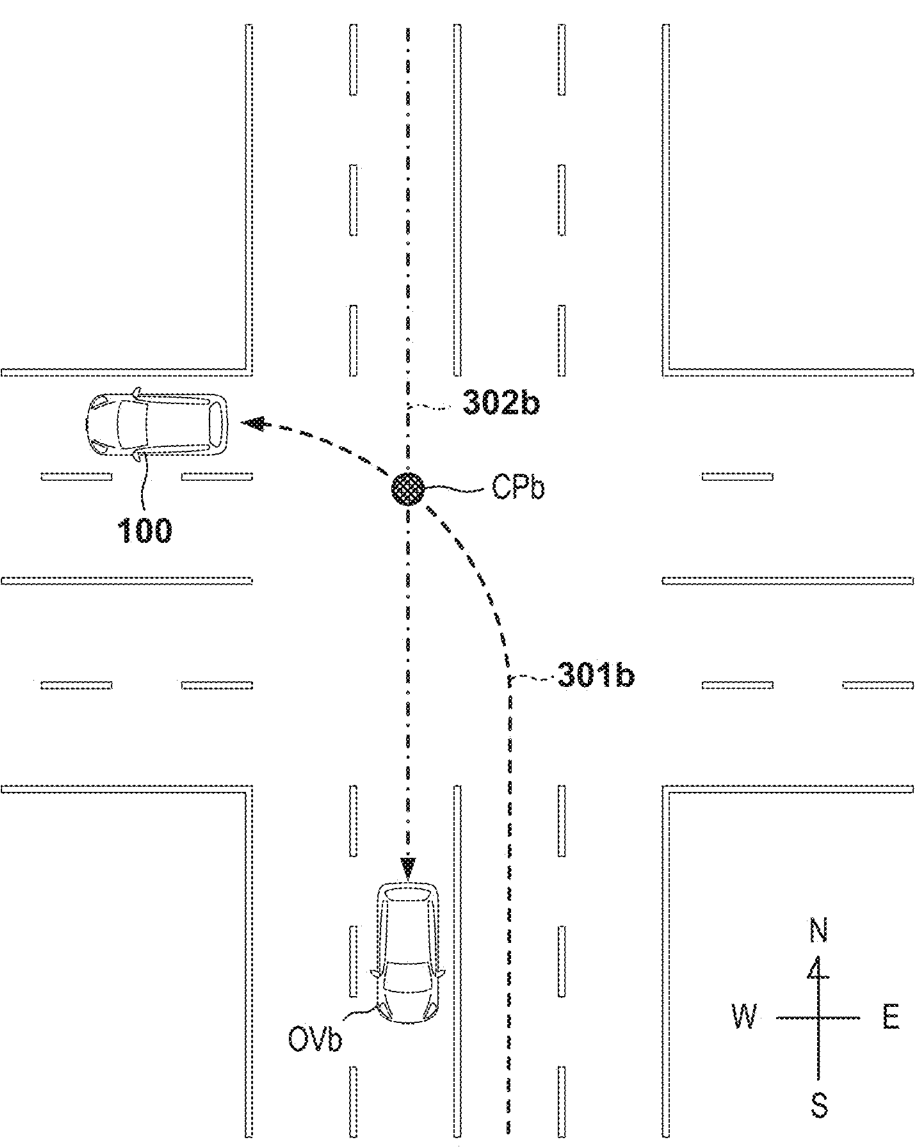

START
S601
IS PERIPHERAL VEHICLE ON SIDE?
NO
YES
S602
WILL PREDICTED COURSES INTERSECT?
NO
YES
S603
SET DETERMINATION REGION WITH PREDICTED INTERSECTION AS REFERENCE POSITION
S604
POSSIBILITY OF COLLISION?
YES
NO
S605
IS ASSISTANCE CONDITION SATISFIED ?
NO
YES
S606
PERFORM DRIVING ASSISTANCE
S607
DEREGISTER?
NO
YES
S608
DELETE DETERMINATION REGION
END

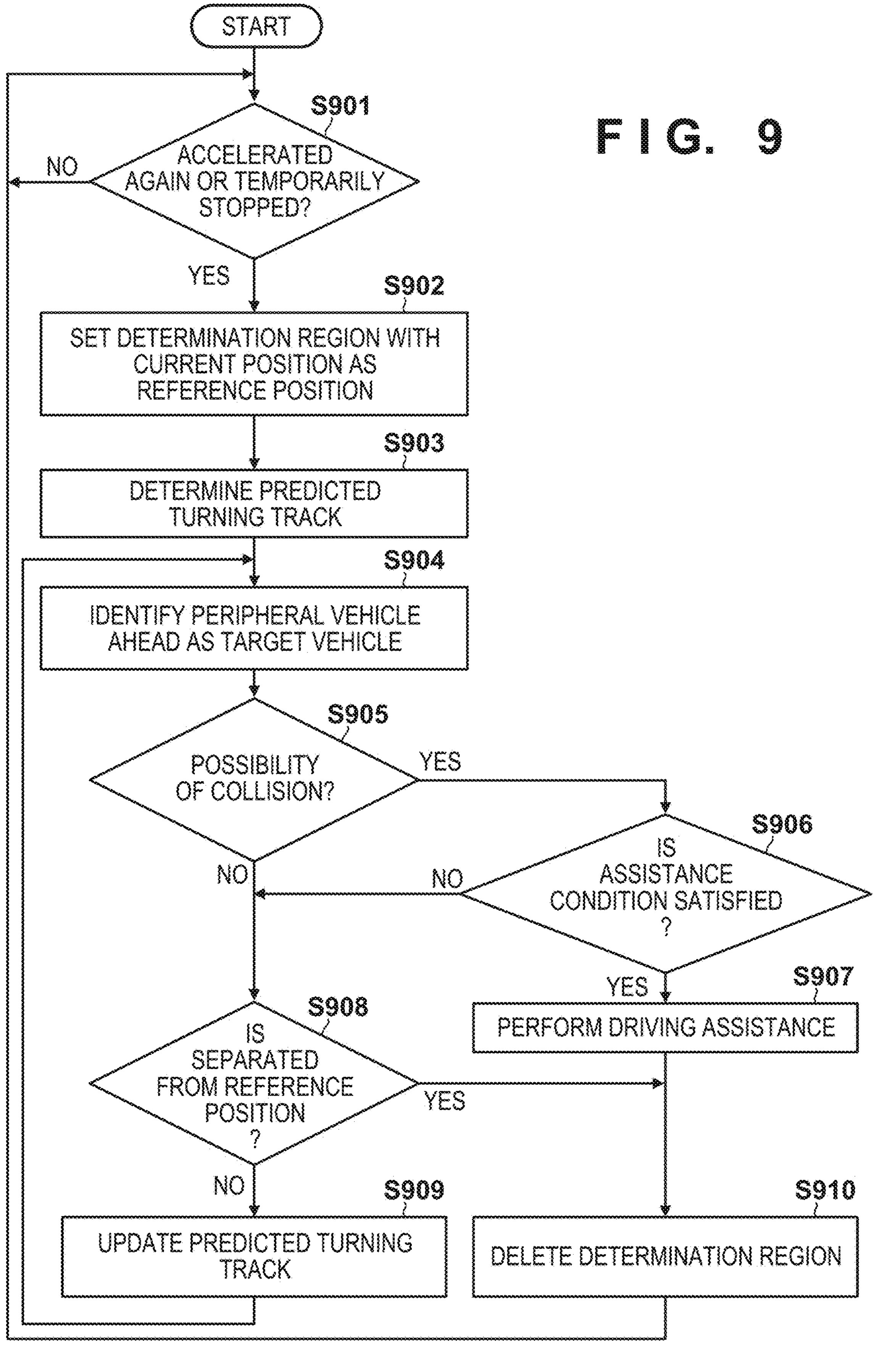
F I G. 9

DRIVING ASSISTANCE DEVICE AND DRIVING ASSISTANCE METHOD

CROSS-REFERENCE TO RELATED APPLICATION(S)

This application claims priority to and the benefit of Japanese Patent Application No. 2023-170825, filed Sep. 29, 2023, and Japanese Patent Application No. 2024-024775, filed Feb. 21, 2024, the entire disclosures of which are incorporated herein by reference.

BACKGROUND OF THE INVENTION

Field of the Invention

The present invention relates to a driving assistance device, a driving assistance method, and a storage medium.

Description of the Related Art

In recent years, efforts to provide access to sustainable transportation systems in consideration of vulnerable people among traffic participants have been gaining momentum. In order to realize this, research and development for further improving traffic safety and convenience is focused on research and development related to preventive safety technique. Known is a device that performs driving assistance for preventing a collision with another vehicle (peripheral vehicle) or the like without using map information. Japanese Patent No. 7054636 discloses a driving assistance device that registers, in a storage unit, position information of an intersection where a traveling track of a self-vehicle and a traveling track of another vehicle intersect, and performs driving assistance of the self-vehicle when the self-vehicle passes through the intersection again. Japanese Patent Laid-Open No. 2022-61482 discloses a technique of predicting a collision on the basis of a speed vector calculated on the basis of a most recent moving direction of another vehicle and a self-vehicle traveling direction. The driving assistance device can identify a risk position where a self-vehicle may collide with another vehicle on the basis of a traveling track of the self-vehicle and a traveling track of the other vehicle, and can use the risk position for driving assistance. However, even when there is actually an intersection in the traveling direction of the self-vehicle, driving assistance using a risk position cannot be performed unless the intersection is identified as the risk position.

SUMMARY OF THE INVENTION

According to some aspects of the present disclosure, an advantageous technique for appropriately performing driving assistance of a self-vehicle is provided. In addition, accordingly, the present invention contributes to development of a sustainable transportation system. According to some embodiments, a driving assistance device comprising: an acquisition unit configured to acquire, from a peripheral vehicle existing around a self-vehicle on which the driving assistance device is mounted, peripheral vehicle information indicating a vehicle speed, a position, and a traveling track of the peripheral vehicle through vehicle-to-vehicle communication; a prediction unit configured to predict a collision possibility between the self-vehicle and the peripheral vehicle based on self-vehicle information indicating a vehicle speed, a position, and a traveling track of the self-vehicle and the peripheral vehicle information; and a notification unit configured to notify an occupant of the self-vehicle based on a prediction result by the prediction unit, wherein the prediction unit is configured to: in a case where the peripheral vehicle exists within a first range in front of the self-vehicle, set a first determination region using a position where the self-vehicle accelerates after decelerating to a threshold value or less or a position where the self-vehicle temporarily stops as a first reference position, and predict a collision possibility between the self-vehicle and the peripheral vehicle in the first determination region; and in a case where the peripheral vehicle exists within a second range on a side of the self-vehicle, set a second determination region using an intersection between a predicted course of the self-vehicle and a predicted course of the peripheral vehicle as a second reference position, and predict a collision possibility between the self-vehicle and the peripheral vehicle in the second determination region is provided.

BRIEF DESCRIPTION OF THE DRAWINGS

FIG. 2 is a flowchart for describing an example of a risk position according to some embodiments;

FIGS. 3A and 3B are schematic diagrams for describing an example of a track intersection according to some embodiments;

FIG. 9 is a flowchart for describing an example of a driving assistance operation related to a peripheral vehicle located on the side according to some embodiments;

DESCRIPTION OF THE EMBODIMENTS

Figure 1:
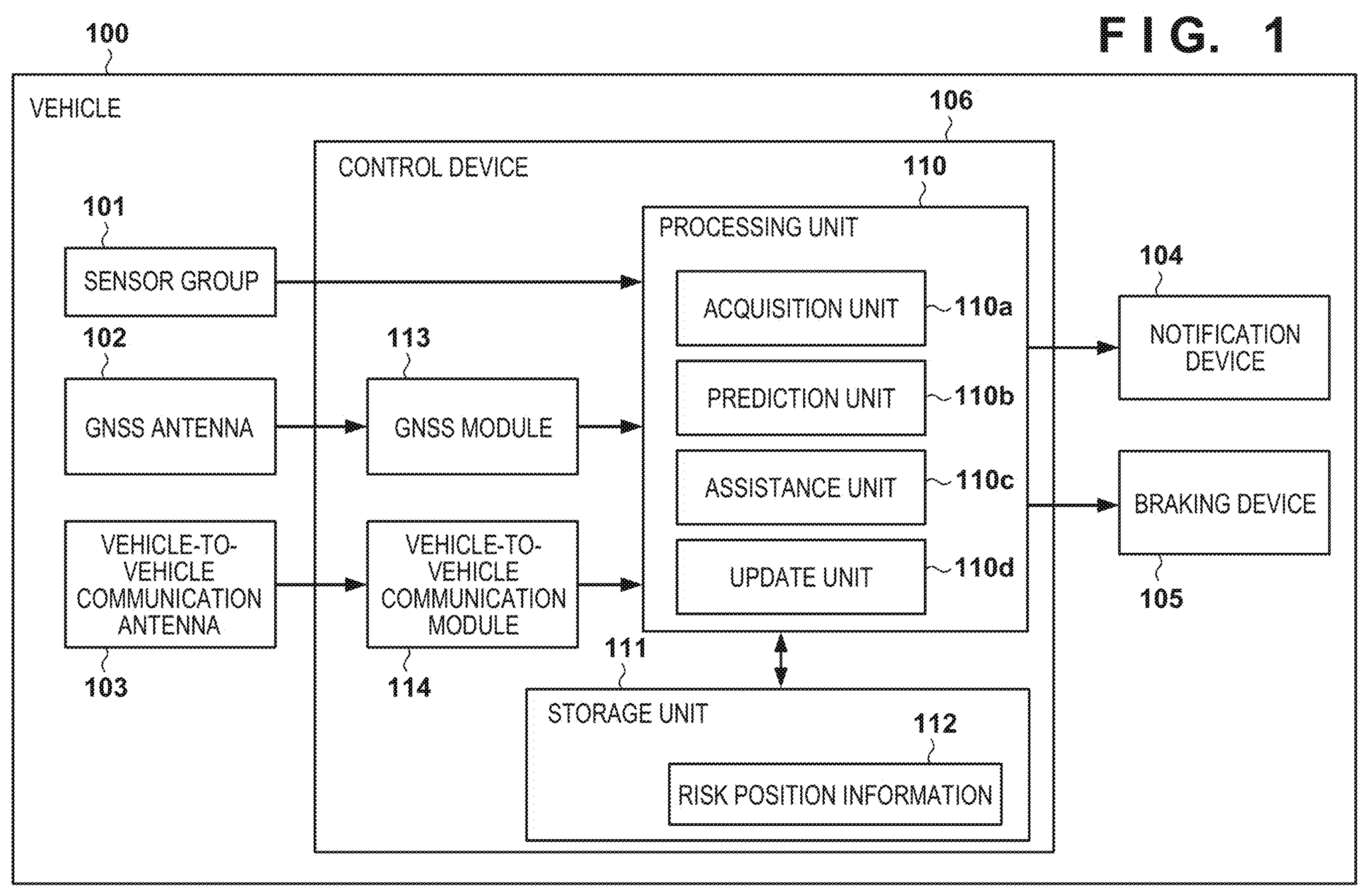
FIG. 1 is a block diagram for describing a configuration example of a vehicle according to some embodiments.

Hereinafter, embodiments will be described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Furthermore, the same reference numerals are given to the same or similar configurations, and redundant description thereof is omitted.

Vehicle Configuration Example

A configuration example of a vehicle 100 according to some embodiments will be described with reference to FIG. 1. As illustrated in FIG. 1, the vehicle 100 may include a sensor group 101, a global navigation satellite system (GNSS) antenna 102, a vehicle-to-vehicle communication antenna 103, a notification device 104, a braking device 105, and a control device 106. Although FIG. 1 illustrates components referenced in the following description, the vehicle 100 may include other components for operating as a vehicle, such as a driving device, a transmission, and a lighting device. Additionally or alternatively, the vehicle 100 may not include some of the components illustrated in FIG. 1. The vehicle 100 may be a four-wheeled vehicle, a two-wheeled vehicle, or another type of vehicle.

The control device 106 controls the overall operation of the vehicle 100. As described later, the control device 106 performs driving assistance of the vehicle 100 on which the control device 106 is mounted. Therefore, the control device 106 may be referred to as a driving assistance device. The driving assistance provided by the control device 106 may be collision prevention assistance for preventing (reducing) a collision with another vehicle. In some embodiments, the control device 106 is capable of performing the collision prevention assistance without using map information. In the following description, the vehicle 100 may be referred to as a self-vehicle 100 to facilitate distinction from other vehicles. In addition, a vehicle different from the vehicle 100 may be referred to as another vehicle. Among other vehicles, a vehicle that currently exists around the self-vehicle 100 may be referred to as a peripheral vehicle. The peripheral vehicle may be a vehicle that can currently perform vehicle-to-vehicle communication with the self-vehicle 100.

The sensor group 101 includes various sensors for performing the driving assistance of the vehicle 100. For example, the sensor group 101 can include a speed sensor that detects the speed of the vehicle 100, an acceleration sensor that detects the acceleration of the vehicle 100, and the like. In addition, the sensor group 101 may include an outside detection sensor such as a camera capable of detecting an object around the vehicle 100, a millimeter wave radar, or a light detection and ranging (LIDAR). The sensor group 101 outputs the detection result to the control device 106.

The GNSS antenna 102 receives radio waves for position measurement transmitted from a GNSS satellite. For example, the GNSS antenna 102 can be used to acquire information regarding the current position and/or the traveling track (traveling history) of the vehicle 100. In addition, the vehicle-to-vehicle communication antenna 103 is an antenna that transmits and receives various data to and from a peripheral vehicle. For example, the vehicle-to-vehicle communication antenna 103 can be used to acquire information regarding the current position, speed, and traveling track of a peripheral vehicle.

The notification device 104 is a device that notifies an occupant (for example, a driver) of the vehicle 100. In a case where the vehicle 100 may collide with a peripheral vehicle, the control device 106 can notify the occupant of the vehicle 100 of the collision possibility with the peripheral vehicle by the notification device 104 as driving assistance. For example, the notification device 104 may include a display unit such as a display and display information indicating a collision possibility with a peripheral vehicle on the display unit, or may include a sound output unit such as a speaker and output information indicating a collision possibility with a peripheral vehicle from the sound output unit by sound or the like.

The braking device 105 is a device, such as a brake, for performing a braking operation of the vehicle 100. In a case where the vehicle 100 may collide with a peripheral vehicle, as driving assistance, the control device 106 can perform deceleration assistance of the vehicle 100 by operating the braking device 105, enabling prevention of collision with the peripheral vehicle.

The control device 106 is a device (computer) that controls the vehicle 100, and can include, for example, an electric control unit (ECU). The control device 106 can perform driving assistance through vehicle-to-vehicle communication with another vehicle and processing in the vehicle 100. For example, the control device 106 can perform driving assistance without using map information. The control device 106 includes a processing unit 110, a storage unit 111, a GNSS module 113, and a vehicle-to-vehicle communication module 114, that are connected by a bus (not illustrated).

The processing unit 110 is a processor represented by a central processing unit (CPU), and executes a program stored in the storage unit 111. The storage unit 111 includes, for example, a random access memory (RAM), a read only memory (ROM), a hard disk, and the like, and stores a program (driving assistance program) for the processing unit 110 to perform driving assistance processing of the vehicle 100, a program (learning program) for the processing unit 110 to learn a risk position, various data, and the like. The storage unit 111 may store risk position information 112 created on the basis of an intersection of a traveling track of the vehicle 100 and a traveling track of another vehicle. The risk position information 112 may include a plurality of risk positions. The risk position may be a position where the vehicle 100 may collide with another vehicle or a position where the collision possibility is high. The risk position information 112 may be managed as a database.

The GNSS module 113 receives position information and the like of the vehicle 100 from the GNSS satellite via the GNSS antenna 102. In addition, the vehicle-to-vehicle communication module 114 receives various types of information from another vehicle via the vehicle-to-vehicle communication antenna 103.

The processing unit 110 can include an acquisition unit 110*a*, a prediction unit 110*b*, an assistance unit 110*c*, and an update unit 110*d* to perform driving assistance (collision prevention assistance in some embodiments) of the vehicle 100. Note that, the processing unit 110 is not limited to the configuration including the units 110*a* to 110*d*. Another unit may be added or some units may be omitted depending on the type of driving assistance performed by the vehicle 100.

The acquisition unit 110*a* acquires peripheral vehicle information indicating a current position, a vehicle speed, and a traveling track of a peripheral vehicle that exists around the vehicle 100 from the peripheral vehicle via the vehicle-to-vehicle communication antenna 103 (vehicle-to-vehicle communication module 114). The peripheral vehicle information may explicitly or implicitly represent the current position, the vehicle speed, and the traveling track of the peripheral vehicle. For example, the peripheral vehicle information may include the vehicle speed as it is, or may include information for calculating the vehicle speed (two current and previous geographical positions and their positioning times). The acquisition unit 110*a* may acquire self-vehicle information indicating a current position, a speed, and a traveling track of the vehicle 100 via the sensor group 101 and the GNSS antenna 102 (GNSS module 113).

The prediction unit 110*b* predicts a possibility that the vehicle 100 collides with another vehicle on the basis of the self-vehicle information and the peripheral vehicle information acquired by the acquisition unit 110*a*. The prediction unit 110*b* may set a determination region and predict a possibility that the vehicle 100 collides with another vehicle in the determination region. In addition, the prediction unit 110*b* may perform driving assistance of the vehicle 100 on the basis of the risk position information 112. For example, in a case where at least one risk position among a plurality of risk positions included in the risk position information 112 is located near the self-vehicle, the prediction unit 110*b* may set the determination region so as to include the risk position.

The assistance unit 110*c* performs driving assistance (collision prevention assistance) for the self-vehicle 100 on the basis of a prediction result by the prediction unit 110*b*. In some embodiments, the assistance unit 110*c* can perform, as driving assistance of the vehicle 100, at least one of notification to an occupant of the vehicle 100 by the notification device 104 and deceleration assistance of the vehicle 100 by the braking device 105.

The update unit 110*d* identifies an intersection between a traveling track of the vehicle 100 and a traveling track of a peripheral vehicle. The intersection between the traveling track of the vehicle 100 and the traveling track of the peripheral vehicle is hereinafter referred to as a track intersection. There may be a road intersection near the track intersection. In addition, the update unit 110*d* updates the risk position information 112 stored in the storage unit 111 on the basis of the identified track intersection. For example, the update unit 110*d* may update the risk position information 112 by adding the track intersection to the risk position information 112. Alternatively or additionally, the update unit 110*d* may update the risk position information 112 by correcting any risk position included in the risk position information 112 on the basis of the track intersection.

Subsequently, an example of the risk position information 112 will be described with reference to FIG. 2. In the example of FIG. 2, the risk position information 112 is described in a table format, but the risk position information 112 may be in another format. The risk position information 112 has a record for each risk position. The column of the risk position information 112 illustrated in FIG. 2 is an example. The risk position information 112 may include other columns or may not include a part of the columns illustrated in FIG. 2.

The risk position information 112 may include information regarding a risk position ID, registration date and time, coordinates, and a passing direction for each risk position. The risk position ID is a number for uniquely identifying the risk position. The registration date and time is a date and time when the risk position is registered in the risk position information 112. The coordinates are data for identifying the risk position, and are represented by, for example, latitude and longitude data. In addition to the latitude and longitude data, the coordinates may include altitude data such as elevation. The passing direction is a direction (direction, angle) in which the vehicle 100 faces when passing through the track intersection used to determine the risk position. The passing direction may be understood as a traveling direction (entering direction) of the vehicle 100 when entering the track intersection. In the example of FIG. 2, the passing direction of the vehicle 100 is prescribed with the north direction as 0°, the east direction as 90°, the south direction as 180°, and the west direction as 270°.

Subsequently, an example of the track intersection will be described with reference to FIGS. 3A and 3B. As described above, the track intersection is an intersection between a traveling track of the vehicle 100 and a traveling track of another vehicle. In the present specification, a case will be described in which the vehicle 100 is traveling in an area where right-hand traffic is mandatory. In this case, an opposite lane side of the vehicle 100 means the left side of the vehicle 100. The embodiment described in the present specification is also applicable to a case in which the vehicle 100 is traveling in an area where left-hand traffic is mandatory. In this case, the opposite lane side of the vehicle 100 means the right side of the vehicle 100.

Figure 3A:
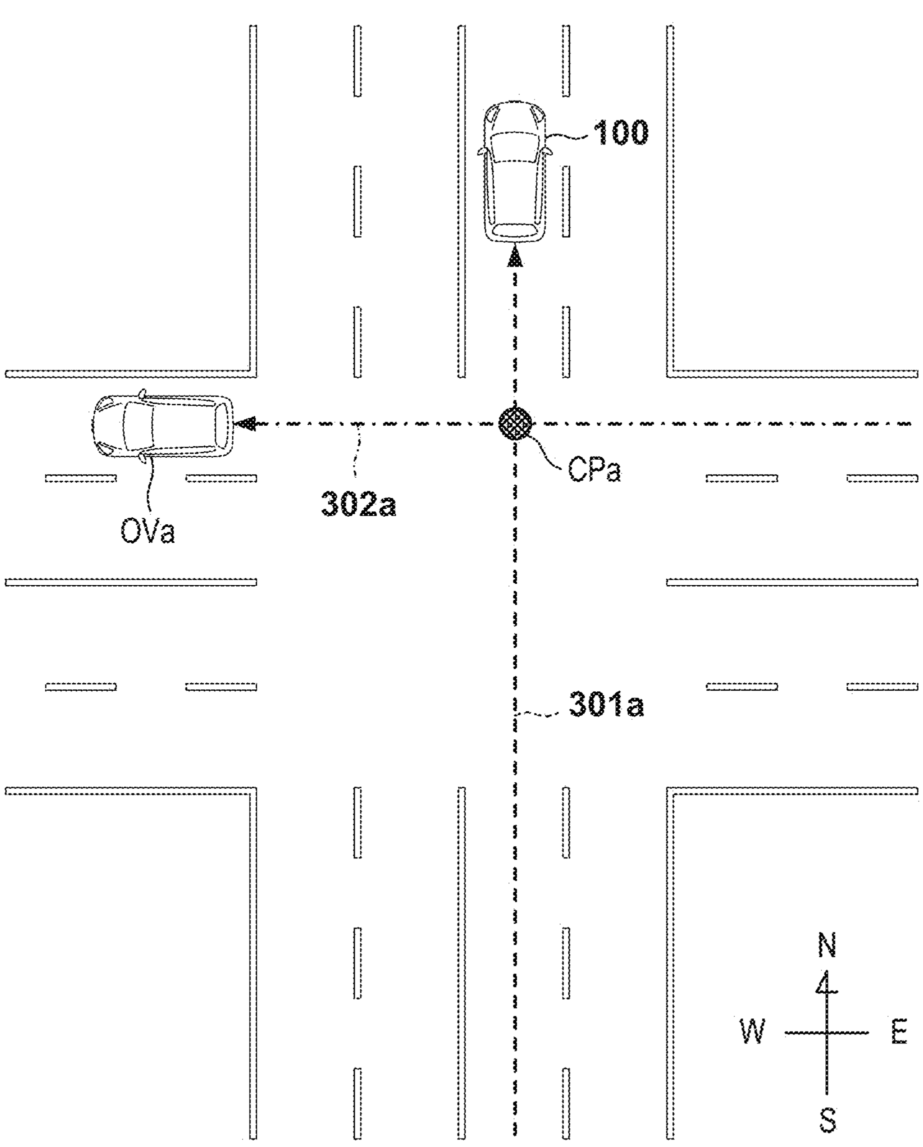

In the example illustrated in FIG. 3A, a position where a traveling track 301*a* of the self-vehicle 100 traveling straight in the north direction and a traveling track 302*a* of another vehicle OVa traveling straight in the west direction intersect is a track intersection CPa. Since the timing (time) at which the self-vehicle 100 passes through the track intersection CPa and the timing (time) at which the other vehicle OVa passes through the track intersection CPa are different from each other, no collision occurs between the self-vehicle 100 and the other vehicle OVa. In addition, the traveling track 301*a* of the self-vehicle 100 is included in the self-vehicle information acquired by the acquisition unit 110*a* via the sensor group 101 and the GNSS antenna 102 (GNSS module 113). The traveling track 302*a* of the other vehicle OVa is included in other vehicle information acquired by the acquisition unit 110*a* via the vehicle-to-vehicle communication antenna 103 (vehicle-to-vehicle communication module 114). Since the other vehicle OVa at the time of the acquisition is a peripheral vehicle that exists around the self-vehicle 100, the other vehicle information may be understood as peripheral vehicle information.

In the example illustrated in FIG. 3B, a position where a traveling track 301*b* of the self-vehicle 100 traveling straight in the north direction and turning left, and a traveling track 302*b* of another vehicle OVb traveling straight in the south direction intersect is a track intersection CPb. Note that, since the timing (time) at which the self-vehicle 100 passes through the track intersection CPb and the timing (time) at which the other vehicle OVb passes through the track intersection CPb are different from each other, no collision occurs between the self-vehicle 100 and the other vehicle OVb. In addition, similarly to the traveling track 301*a*, the traveling track 301*b* of the self-vehicle 100 is included in the self-vehicle information acquired by the acquisition unit 110*a* via the sensor group 101 and the GNSS antenna 102 (GNSS module 113). Similarly to the traveling track 302*a*, the traveling track 302*b* of the other vehicle OVb is included in the other vehicle information (peripheral vehicle information) acquired by the acquisition unit 110*a* via the vehicle-to-vehicle communication antenna 103 (vehicle-to-vehicle communication module 114).

The function of the control device 106 can be realized by either hardware or software. For example, the function of the control device 106 may be realized by the processing unit 110 (CPU) performing the driving assistance program and/or the learning program as described above, or may be realized by an integrated circuit such as a programmable logic device (PLD) or an application specific integrated circuit (ASIC). In addition, in the example of FIG. 1, although the control device 106 is illustrated as a single element, the control device 106 may be divided into two or more elements as necessary.

<Management Processing of Peripheral Vehicle>

Figure 4:
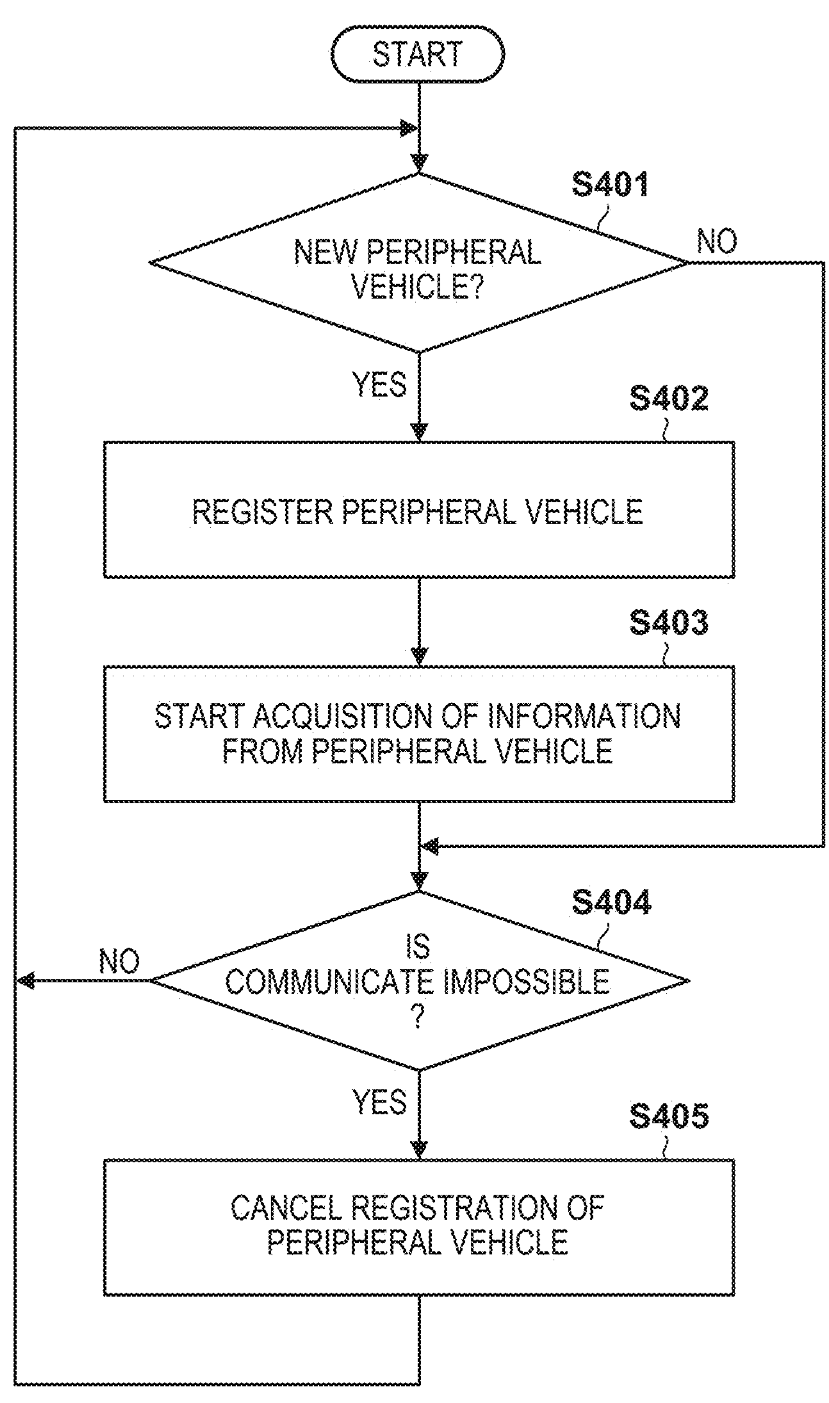
FIG. 4 is a flowchart for describing an example of a method of registering a peripheral vehicle according to some embodiments.

An example of a processing of managing a peripheral vehicle will be described with reference to FIG. 4. The processing illustrated in the flowchart of FIG. 4 is performed by the processing unit 110 according to the learning program read from the storage unit 111. The processing in FIG. 4 may be started, for example, in response to the ignition of the vehicle 100 being turned on. The processing in FIG. 4 can be repeatedly performed until the ignition of the vehicle 100 is turned off.

In step S401, the processing unit 110 (for example, the acquisition unit 110*a* thereof) determines whether or not another vehicle exists around the self-vehicle 100. In a case where it is determined that another vehicle exists around the self-vehicle 100, the processing unit 110 shifts the processing to step S402, and shifts the processing to step S404 in other cases. For example, in a case where vehicle-to-vehicle communication can be performed via the vehicle-to-vehicle communication antenna 103 (vehicle-to-vehicle communication module 114), the processing unit 110 may determine that another vehicle exists around the self-vehicle 100.

In step S402, the processing unit 110 (for example, the acquisition unit 110*a* thereof) registers the other vehicle found in step S401 as a peripheral vehicle. For example, the storage unit 111 may store a list of peripheral vehicles, and the processing unit 110 may add information of the found peripheral vehicle to this list. As will be described later, the peripheral vehicle is subjected to determination of the collision possibility.

In step S403, the processing unit 110 (for example, the acquisition unit 110*a* thereof) starts acquisition of peripheral vehicle information from the peripheral vehicle by the vehicle-to-vehicle communication. As described above, the peripheral vehicle information may represent the vehicle speed, the position, and the traveling track of the peripheral vehicle. After starting the acquisition of the peripheral vehicle information in step S403, the processing unit 110 periodically (for example, every 100 ms) repeatedly acquires the peripheral vehicle information until the vehicle-to-vehicle communication with the peripheral vehicle can no longer be performed.

After the start of the acquisition of the peripheral vehicle information, in step S404, the processing unit 110 (for example, the acquisition unit 110*a* thereof) determines whether or not a vehicle that cannot perform the vehicle-to-vehicle communication exists among one or more registered peripheral vehicles. In a case where such a vehicle exists, the processing unit 110 shifts the processing to step S405, and shifts the processing to step S401 in other cases. For example, in a case where the peripheral vehicle is out of the communication range of the vehicle-to-vehicle communication or the power of the peripheral vehicle is turned off, the vehicle 100 cannot perform the vehicle-to-vehicle communication with the peripheral vehicle.

In step S405, the processing unit 110 (for example, the acquisition unit 110*a* thereof) cancels the registration of the peripheral vehicle that cannot perform the vehicle-to-vehicle communication. In other words, the processing unit 110 does not treat the vehicle that cannot perform the vehicle-to-vehicle communication as a peripheral vehicle. For example, the processing unit 110 deletes, from the list of peripheral vehicles stored in the storage unit 111, information on the peripheral vehicle that cannot perform the vehicle-to-vehicle communication.

As described above, by performing the processing of FIG. 4, the processing unit 110 can periodically acquire the latest peripheral vehicle information from another vehicle (that is, a peripheral vehicle) around the self-vehicle 100.

<Driving Assistance Processing>

Driving assistance processing of some embodiments will be described with reference to FIGS. 5 to 10. As described with reference to FIG. 3A, when both the self-vehicle 100 and another vehicle travel straight in a case where the other vehicle is included in the range on the side of the self-vehicle 100, these vehicles may collide with each other. On the other hand, as described with reference to FIG. 3B, when the self-vehicle 100 turns left and another vehicle travels straight in a case where the other vehicle is included in the range in the forward part of the self-vehicle 100, these vehicles may collide with each other. As described above, depending on the position of the other vehicle with respect to the self-vehicle 100, the position (that is, the risk position) where these vehicles may collide with each other can vary. Therefore, in some embodiments, the control device 106 performs separate driving assistance according to whether a peripheral vehicle exists within the range in the forward part of the self-vehicle 100 or within the range on the side of the self-vehicle 100.

Figure 5:
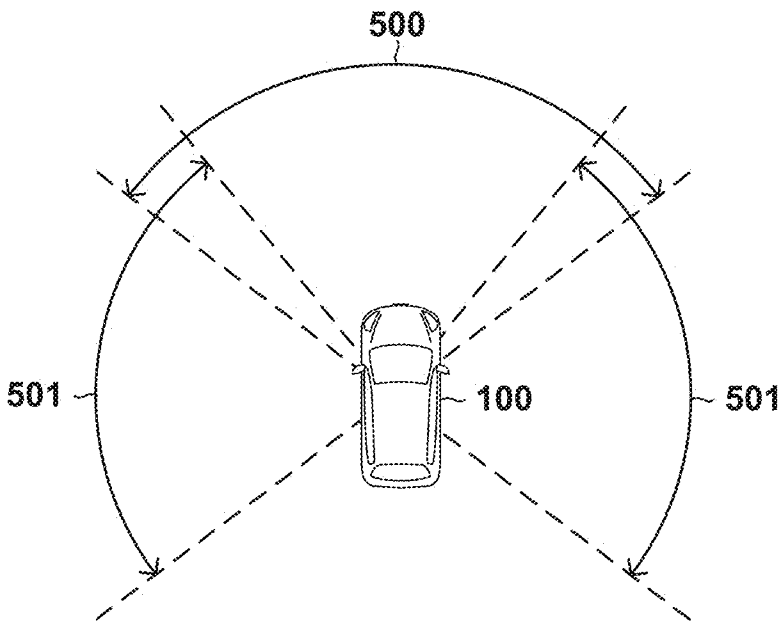
FIG. 5 is a schematic diagram for describing an example of a range including the peripheral vehicle according to some embodiments.

A range for selecting a driving assistance method will be described with reference to FIG. 5. A range 500 is located at forward part of the vehicle 100. The forward part of the vehicle 100 may be a range including the front of the vehicle 100. As illustrated in FIG. 5, the range 500 may be a fan-shaped region or may have another shape. The range 500 may be symmetrical with respect to the direction of the front of the vehicle 100. The central angle of the range 500 may be, for example, about 100 degrees to 110 degrees. A range 501 is located on the side of the vehicle 100. The side of the vehicle 100 may be a range including the oblique front of the vehicle 100. The range 501 may include the direction just beside the vehicle 100. As illustrated in FIG. 5, the range 501 may be a fan-shaped region or may have another shape. In the example of FIG. 5, the range 501 is located on each of the right side and the left side of the vehicle 100. The central angle of the range 501 may be, for example, about 80 degrees to 90 degrees. In the example of FIG. 5, a part of the range 500 and a part of the range 501 overlap. The central angle of the overlapped part may be, for example, about 10 degrees to 20 degrees. In a case where a peripheral vehicle exists in the overlapped part, the peripheral vehicle is subjected to both driving assistance under the situation of FIG. 3A and driving assistance under the situation of FIG. 3B. Instead of the example of FIG. 5, the range 500 and the range 501 may be only in contact with each other or may be separated from each other.

In a case where a peripheral vehicle is included in the range 501, as illustrated in FIG. 3A, the self-vehicle 100 can collide with the other vehicle by traveling straight. Therefore, the control device 106 predicts the collision possibility due to the self-vehicle 100 traveling straight. This operation will be described later with reference to FIGS. 6 to 8. Meanwhile, in a case where a peripheral vehicle is included in the range 500, as illustrated in FIG. 3B, the self-vehicle 100 can collide with the other vehicle by turning left. Therefore, the control device 106 predicts the collision possibility due to the self-vehicle 100 traveling straight. This operation will be described later with reference to FIGS. 9 to 10. The positions of the ranges 500 and 501 with respect to the self-vehicle 100 may be set in advance (for example, at the time of manufacturing the vehicle 100 or at the time of updating the software) and stored in the storage unit 111.

Figure 6:
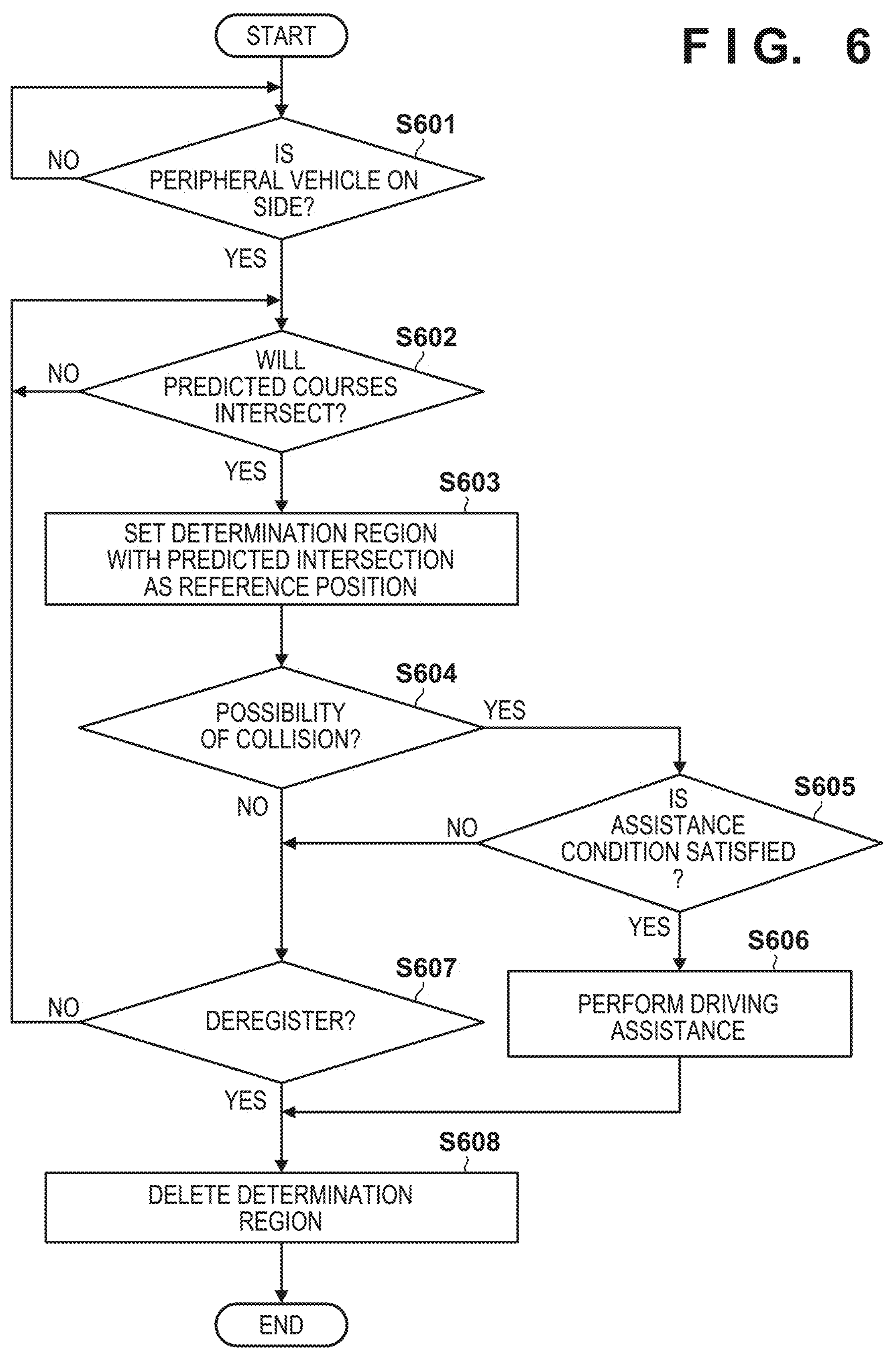
FIG. 6 is a flowchart for describing an example of a driving assistance operation related to a peripheral vehicle located ahead according to some embodiments.

FIG. 6 describes an example of a processing for performing driving assistance in a case where a peripheral vehicle RV (FIG. 7A) exists within the range 501 on the side of the self-vehicle 100. The processing illustrated in the flowchart of FIG. 6 is performed by the processing unit 110 according to the driving assistance program read from the storage unit 111. Every time the peripheral vehicle RV is newly registered in step S402 of FIG. 4 while the driving assistance setting is on, for example, the processing in FIG. 6 may be performed for the peripheral vehicle RV. In the processing in FIG. 6, a plurality of other vehicles can be registered as peripheral vehicles. The processing in FIG. 6 is performed for each of the plurality of peripheral vehicles.

In step S601, the processing unit 110 (for example, the prediction unit 110*b* thereof) determines whether or not the peripheral vehicle RV exists within the range 501 on the side of the self-vehicle 100. In a case where it is determined that the peripheral vehicle RV exists within the range 501 on the side of the self-vehicle 100, the processing unit 110 shifts the processing to step S602, and repeats step S601 in other cases. This determination may be made on the basis of the current position of the peripheral vehicle RV included in the latest peripheral vehicle information acquired from the peripheral vehicle RV. In the example illustrated in FIG. 7A, the peripheral vehicle RV exists within the range 501.

In step S602, the processing unit 110 (for example, the prediction unit 110*b* thereof) determines whether or not the predicted course of the self-vehicle 100 and the predicted course of the peripheral vehicle RV intersect. In a case where it is determined that these predicted courses intersect, the processing unit 110 shifts the processing to step S603, and repeats step S602 in other cases. The predicted course may be a half line extending forward from a vehicle. In the example illustrated in FIG. 7A, a predicted course 700 of the self-vehicle 100 and a predicted course 701 of the peripheral vehicle RV intersect. An intersection between the predicted course 700 of the self-vehicle 100 and the predicted course 701 of the peripheral vehicle RV is referred to as a predicted intersection 702. The predicted course 700 of the self-vehicle 100 may be determined on the basis of the self-vehicle information (specifically, the current position and the traveling track). The processing unit 110 may acquire the latest self-vehicle information at this time point. The predicted course 701 of the peripheral vehicle RV may be determined on the basis of the latest peripheral vehicle information (specifically, the current position and the traveling track).

In step S603, the processing unit 110 (for example, the prediction unit 110*b* thereof) sets a determination region using the predicted intersection 702 as a reference position, and stores the determination region in the storage unit 111. The determination region may be a region where a collision possibility is predicted. An example of a determination region 703 set using the predicted intersection 702 as a reference position will be described with reference to FIG. 7A. The determination region 703 may be a rectangle including the predicted intersection 702 and a side parallel to the predicted course 700 of the self-vehicle 100. Alternatively, the determination region 703 may have another shape. The position with respect to the predicted intersection 702 and the shape of the determination region 703 may be set in advance (for example, at the time of manufacturing the vehicle 100 or at the time of updating the software) and stored in the storage unit 111. In a case where a risk position exists near the determination region 703, the processing unit 110 may expand the determination region 703 to include the risk position.

Figure 7A:
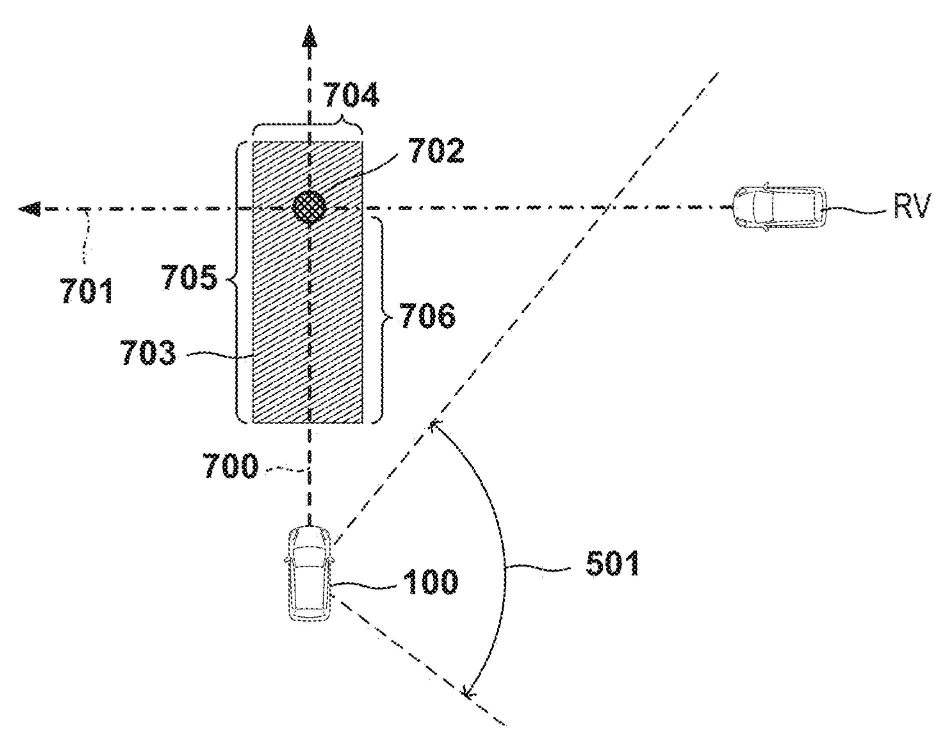
FIGS. 7A and 7B are schematic diagrams for describing an example of a driving assistance operation related to a peripheral vehicle located ahead according to some embodiments.
Figure 7B:
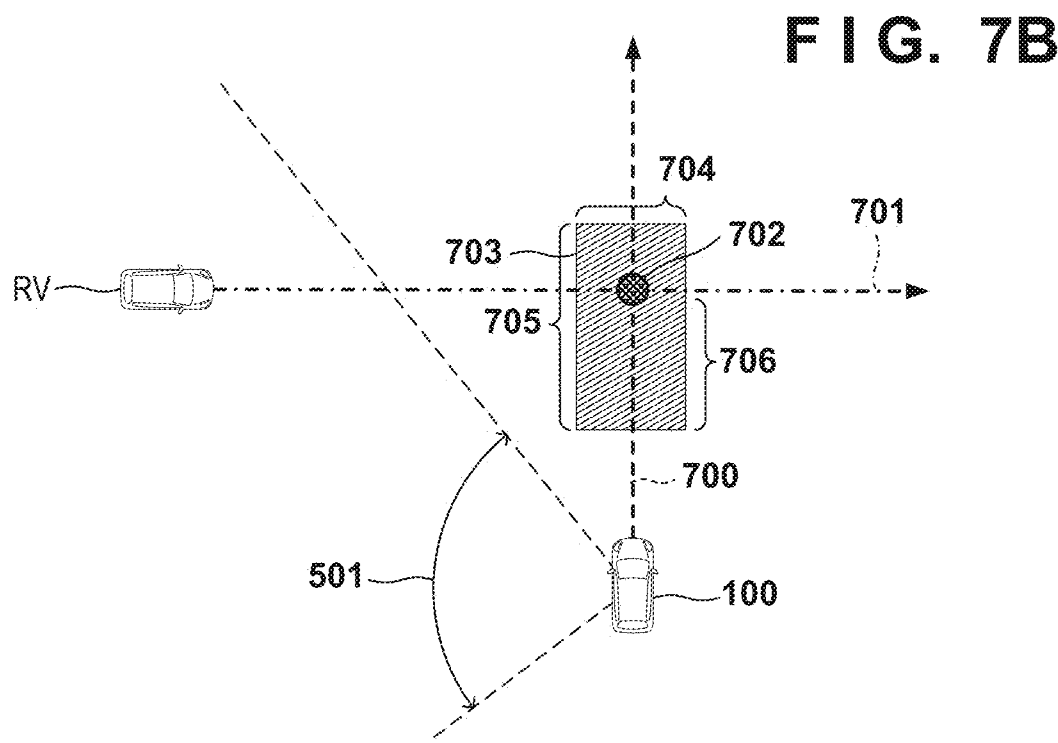

The processing unit 110 may set the determination regions 703 having different shape (size) between a case where the peripheral vehicle RV is on the right side (that is, a side opposite to the opposite lane side) with respect to the self-vehicle 100 as illustrated in FIG. 7A, and a case where the peripheral vehicle RV is on the left side (that is, the opposite lane side) with respect to the self-vehicle 100 as illustrated in FIG. 7B. A length 704 of the determination region 703 in the vehicle width direction may be the same length (for example, 3 m to 4 m, which is a length corresponding to one lane.) regardless of whether the peripheral vehicle RV is on the right side or the left side of the self-vehicle 100. A length 705 of the determination region 703 in the vehicle length direction in a case where the peripheral vehicle RV is on the right side of the self-vehicle 100 may be longer than the length 705 of the determination region 703 in the vehicle length direction in a case where the peripheral vehicle RV is on the left side of the self-vehicle 100. The length 705 of the determination region 703 in the vehicle length direction in a case where the peripheral vehicle RV is on the right side of the self-vehicle 100 may be 9 m to 11 m, which is a length corresponding to three lanes, for example. The length 705 of the determination region 703 in the vehicle length direction in a case where the peripheral vehicle RV is on the left side of the self-vehicle 100 may be 6 m to 8 m, which is a length corresponding to two lanes, for example.

The distance between a side of the determination region 703 far from the self-vehicle 100 and the predicted intersection 702 may be the same (for example, about 1.5 m equivalent to a half lane) regardless of whether the peripheral vehicle RV is on the right side or the left side of the self-vehicle 100. As a result, a length 706 of a part located closer to the self-vehicle 100 than the predicted intersection 702 in the determination region 703 in a case where the peripheral vehicle RV is on the right side of the self-vehicle 100 is longer than a length 706 of a part located closer to the self-vehicle 100 than the predicted intersection 702 in the determination region 703 in a case where the peripheral vehicle RV is on the left side of the self-vehicle 100. In a case where the peripheral vehicle RV is on the right side of the self-vehicle 100, there is a possibility that there is an opposite lane of the lane on which the peripheral vehicle RV is traveling between the predicted intersection 702 and the self-vehicle 100. Therefore, by expanding the determination region 703 toward the self-vehicle 100, it is possible to suppress a collision with another vehicle (which may not have a vehicle-to-vehicle communication function) traveling on this opposite lane.

In step S604, the processing unit 110 (for example, the prediction unit 110*b* thereof) predicts the collision possibility between the self-vehicle 100 and the peripheral vehicle RV in the determination region 703. In a case where it is determined that there is a collision possibility between the self-vehicle 100 and the peripheral vehicle RV, the processing unit 110 shifts the processing to step S605, and shifts the processing to step S607 in other cases.

The collision possibility may be determined on the basis of a predicted time (hereinafter, it is simply referred to as "arrival time".) until the peripheral vehicle RV reaches the predicted intersection 702. This arrival time may be calculated on the basis of, for example, the latest peripheral vehicle information acquired from the peripheral vehicle RV. For example, the processing unit 110 can predict the predicted time of the peripheral vehicle RV to the predicted intersection 702 by dividing the distance between the peripheral vehicle RV and the predicted intersection 702 by the speed of the peripheral vehicle RV.

The processing unit 110 may determine that there is a collision possibility in a case where the arrival time is equal to or less than a time threshold value, and may determine that there is no collision possibility in a case where the arrival time is greater than the time threshold value. The time threshold value may be settable by an occupant of the self-vehicle 100.

Figure 8:
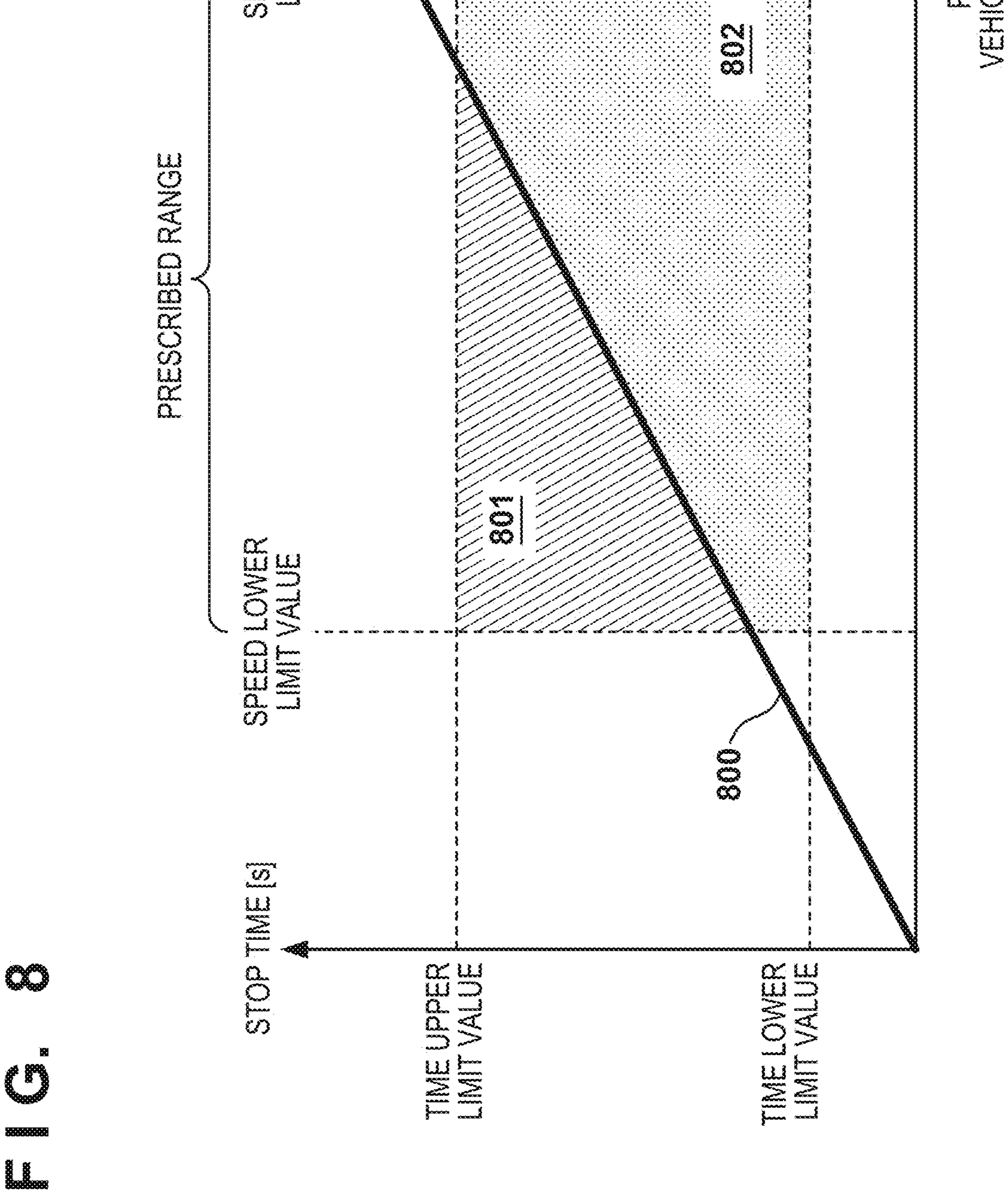
FIG. 8 is a schematic diagram for describing an example of a driving assistance operation related to a peripheral vehicle located ahead according to some embodiments.

The processing unit 110 may change the time threshold value according to the speed of the peripheral vehicle RV. FIG. 8 is a diagram illustrating a relationship between the speed of the peripheral vehicle RV and stop time of the peripheral vehicle RV. The stop time of the peripheral vehicle RV is a time until the peripheral vehicle RV stops at speed reduction rate (for example, 0.4 G) by a general brake operation. FIG. 8 illustrates a prescribed range (speed upper limit value and speed lower limit value) related to the speed of the peripheral vehicle RV, and a time upper limit value and a time lower limit value related to time to collision (TTC). The prescribed range is a speed range of the peripheral vehicle RV on which driving assistance for the self-vehicle 100 is performed. The time upper limit value is an upper limit value of the time to collision arbitrarily set by a driver or the like, and the time lower limit value is a lower limit value of the time to collision set from the measurement position accuracy of the GNSS.

The processing unit 110 sets the stop time corresponding to the speed of the peripheral vehicle RV as a time threshold value on the basis of the "relationship between the speed and the stop time of the peripheral vehicle RV" indicated by a line 800 in FIG. 8. In an area 801 above the line 800, if the arrival time is longer than the stop time and a driver of the peripheral vehicle RV performs a general brake operation (for example, speed reduction rate 0.4 G), the peripheral vehicle RV can be stopped before the peripheral vehicle RV reaches the predicted intersection 702. Therefore, in a case where the arrival time is larger than the time threshold value (stop time), driving assistance of a self-vehicle SV can be suppressed. On the other hand, in an area 802 below the line 800, the arrival time is shorter than the stop time, and even if the driver of the peripheral vehicle RV performs a general brake operation (for example, speed reduction rate 0.4 G), the peripheral vehicle RV can reach the predicted intersection 702 before the peripheral vehicle RV is stopped. Therefore, in a case where the arrival time is equal to or less than the time threshold value (stop time), driving assistance of the self-vehicle SV can be performed. Note that, the processing unit 110 may change the time threshold value continuously or stepwise in accordance with the speed of the peripheral vehicle RV.

The collision possibility may be determined on the basis of entry of the self-vehicle 100 into the determination region 703 instead of or in addition to the arrival time until the peripheral vehicle RV reaches the predicted intersection 702. For example, the processing unit 110 may determine that there is a collision possibility in a case where the self-vehicle 100 has entered the determination region 703, and may determine that there is no collision possibility in a case where the self-vehicle 100 has not entered the determination region 703.

Furthermore, the collision possibility may be determined on the basis of the difference (hereinafter, it is referred to as "arrival time difference".) between the predicted time until the peripheral vehicle RV reaches the predicted intersection 702 and the predicted time until the self-vehicle 100 reaches the predicted intersection 702. The processing unit 110 may determine that there is a collision possibility in a case where the arrival time difference is equal to or less than the time threshold value, and may determine that there is no collision possibility in a case where the arrival time difference is greater than the time threshold value. The time threshold value may be settable by an occupant of the self-vehicle 100.

The collision possibility may be determined by arbitrarily combining the above three conditions (that is, the arrival time is equal to or less than the time threshold value, the self-vehicle 100 has entered the determination region 703, and the arrival time difference is equal to or less than another time threshold value.). For example, in a case where all of these three conditions are satisfied, the processing unit 110 may determine that there is a collision possibility, and may determine that there is no collision possibility in other cases. Alternatively, in a case where at least one of these three conditions is satisfied, the processing unit 110 may determine that there is a collision possibility, and may determine that there is no collision possibility in other cases. Alternatively, in a case where at least one of the two preset conditions of these three conditions is satisfied, the processing unit 110 may determine that there is a collision possibility, and determine that there is no collision possibility in other cases. Specifically, in a case where the predicted time until the peripheral vehicle RV reaches the predicted intersection 702 is smaller than a first time threshold value, the processing unit 110 may predict that there is a collision possibility if the arrival time difference is larger than a second time threshold value, and may predict that there is no collision possibility if the arrival time difference is smaller than the second time threshold value.

In step S605, the processing unit 110 (for example, the assistance unit 110*c* thereof) determines whether or not the assistance condition is satisfied. In a case where it is determined that the assistance condition is satisfied, the processing unit 110 shifts the processing to step S606, and shifts the processing to step S607 in other cases. The assistance condition may be a condition to be satisfied in order to perform driving assistance. For example, the assistance condition may be based on whether or not the speed of the peripheral vehicle RV is within a prescribed range. The prescribed range can be set in advance using the speed lower limit value and the speed upper limit value related to the speed of the peripheral vehicle RV. In a case where the speed of the peripheral vehicle RV is equal to or less than the speed lower limit value in the prescribed range, there is a high possibility that the driver of the peripheral vehicle RV notices the self-vehicle 100 and decelerates the peripheral vehicle RV without colliding with the self-vehicle 100. That is, the speed lower limit value in the prescribed range related to the speed of the peripheral vehicle RV can be set to a value that allows the peripheral vehicle RV to be decelerated without colliding with the self-vehicle 100. In addition, in a case where the speed of the peripheral vehicle RV is equal to or greater than the upper limit value of the prescribed range, there is a high possibility that the peripheral vehicle RV is not a vehicle traveling on a road the self-vehicle 100 enters, such as traveling on an expressway in the vicinity of the road the self-vehicle 100 enters. That is, the upper limit value of the prescribed range related to the speed of the peripheral vehicle RV can be set to a value that enables determination of whether the vehicle is traveling on a road the self-vehicle 100 enters or traveling on an expressway in the vicinity of the road. In this manner, the driving assistance is performed/suppressed according to whether or not the speed of the peripheral vehicle RV is within the prescribed range, so that it is possible to reduce annoyance feeling of a driver of the self-vehicle 100 against the driving assistance.

In step S606, the processing unit 110 (for example, the assistance unit 110*c* thereof) performs driving assistance for the self-vehicle 100. As driving assistance for the self-vehicle 100, the processing unit 110 can notify an occupant of the self-vehicle 100 of the collision possibility by the notification device 104, and perform a braking operation of the self-vehicle 100 by the braking device 105.

In step S608, the processing unit 110 (for example, the prediction unit 110*b* thereof) deletes, from the storage unit 111, the determination region (the determination region stored in step S603) that becomes unnecessary due to performance of the driving assistance. As a result, the capacity of the storage unit 111 is suppressed from being consumed by unnecessary information.

In a case where it is determined in step S604 that there is no collision possibility or in a case where it is determined in step S605 that the assistance condition is not satisfied, step S607 is performed. In step S607, the processing unit 110 (for example, the prediction unit 110*b* thereof) determines whether or not the registration of the peripheral vehicle RV to be processed in the method of FIG. 6 has been canceled in step S405 of FIG. 4. In a case where it is determined that the registration of the peripheral vehicle RV has been canceled, the processing unit 110 shifts the processing to step S608, and shifts the processing to step S602 in other cases. In a case where the registration of the peripheral vehicle RV has been canceled, it is considered that the peripheral vehicle RV no longer exists around the self-vehicle 100. Therefore, the processing unit 110 ends the processing without performing driving assistance for the collision with the peripheral vehicle RV. Also in this case, in step S608, the processing unit 110 (for example, the prediction unit 110*b* thereof) deletes the unnecessary determination region from the storage unit 111.

In a case where it is determined in step S607 that the registration of the peripheral vehicle RV has not been canceled, the processing returns to step S602. In this case, in a case where the predicted course of the self-vehicle 100 still intersects with the predicted course of the peripheral vehicle RV, the determination region is set using the predicted intersection 702 as a reference position in step S603. In a case where a vehicle (the self-vehicle 100 or the peripheral vehicle RV) changes its position in the lane or changes the lane, the position of the predicted intersection 702 can change. Since the peripheral vehicle information is repeatedly acquired, the processing unit 110 can detect such a change in the position of the predicted intersection 702. Therefore, in step S603, the processing unit 110 (for example, the prediction unit 110*b* thereof) resets a reference position on the basis of the newly acquired peripheral vehicle information, and updates the determination region stored in the storage unit 111 accordingly. As a result, the determination in step S604 is performed on the basis of the updated determination region. In step S603, in a case where the predicted intersection 702 cannot be determined (for example, in a case where the predicted course 700 of the self-vehicle 100 and the predicted course 701 of the peripheral vehicle RV no longer intersect with each other), the most recently determined reference position and determination region are maintained.

According to the method of FIG. 6, in a case where a plurality of peripheral vehicles exists within the range 501 on the side of the self-vehicle 100, an individual reference position is used for each of the plurality of peripheral vehicles. Specifically, the method of FIG. 6 is performed individually for each of the plurality of peripheral vehicles. As a result, the predicted intersection between the predicted course of the self-vehicle 100 and the predicted course of the peripheral vehicle is also determined for each of the plurality of peripheral vehicles. As a result, for each of the plurality of peripheral vehicles, an individual determination region is set on the basis of the individual reference position. As a result, the possibility of collision with each of the plurality of peripheral vehicles can be appropriately predicted.

FIG. 9 describes an example of a processing for performing driving assistance in a case where a peripheral vehicle RV (FIG. 10) exists within the range 500 in front of the self-vehicle 100. The processing illustrated in the flowchart of FIG. 9 is performed by the processing unit 110 according to the learning program read from the storage unit 111. The processing of FIG. 9 may be started, for example, in response to the setting of the driving assistance being turned on. The processing of FIG. 9 may be repeatedly performed until the setting of the driving assistance is turned off or the ignition of the vehicle 100 is turned off.

Figure 10:
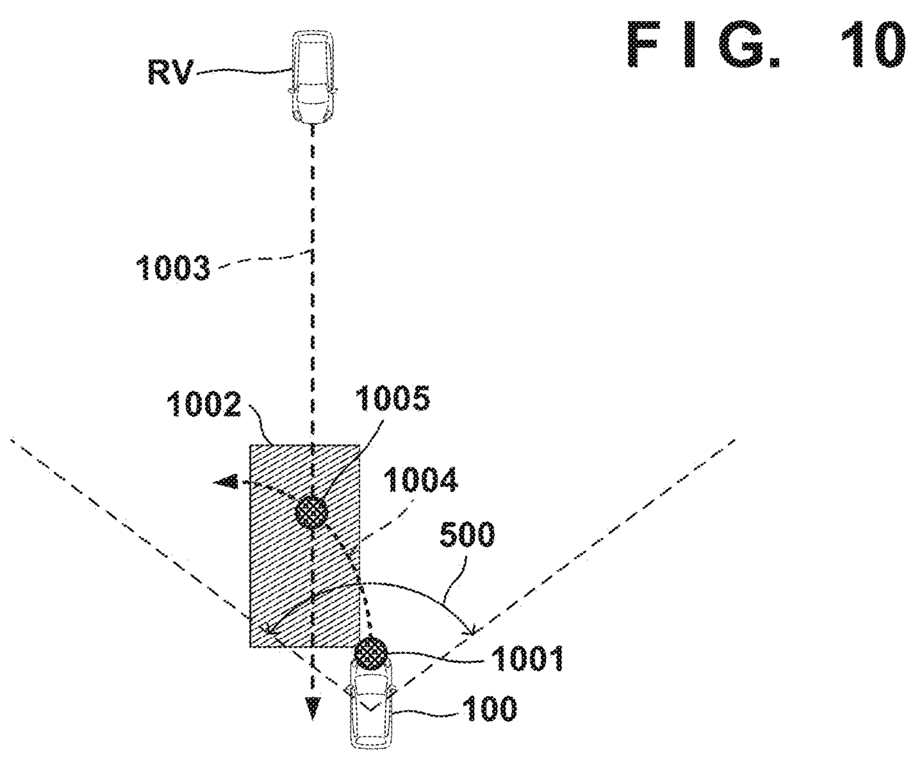
FIG. 10 is a schematic diagram for describing an example of a driving assistance operation related to a peripheral vehicle located on the side according to some embodiments.

In step S901, the processing unit 110 (for example, the prediction unit 110*b* thereof) determines whether the self-vehicle 100 has accelerated after decelerating to a threshold value or less or the self-vehicle 100 has temporarily stopped. In a case where it is determined that the self-vehicle 100 has accelerated after decelerating to a threshold value or less or the self-vehicle 100 has temporarily stopped, the processing unit 110 shifts the processing to step S902, and repeats step S901 in other cases. This determination may be made on the basis of the vehicle speed and the acceleration of the self-vehicle 100 included in the latest self-vehicle information. The threshold value used in step S901 is a value below the vehicle speed after the vehicle 100 decelerates to turn (for example, left turn or right turn), and may be, for example, 20 km/h. A position where the self-vehicle 100 accelerates after decelerating to the threshold value or less or a position where the self-vehicle 100 temporarily stops is referred to as a turning preparation position 1001 (FIG. 10). Note that, even when not turning, the self-vehicle 100 can accelerate after decelerating to the threshold value or less or temporarily stop. Even in this case, the processing unit 110 detects the turning preparation position 1001 and performs the processing of and after step S902.

In step S902, the processing unit 110 (for example, the prediction unit 110*b* thereof) sets a determination region using the turning preparation position 1001 as a reference position, and stores the reference position and the determination region in the storage unit 111. The determination region may be a region where a collision possibility is predicted. An example of a determination region 1002 set using the turning preparation position 1001 as a reference position will be described with reference to FIG. 10. The determination region 1002 may be a rectangle centered at a position on the left front of the turning preparation position 1001 and including a side parallel to the vehicle length direction of the self-vehicle 100. The length of the determination region 1002 in the vehicle width direction of the self-vehicle 100 may be, for example, 3 m to 4 m, which is a length corresponding to one lane. The length of the determination region 1002 in the vehicle length direction of the self-vehicle 100 may be, for example, 9 m to 11 m, which is a length corresponding to three lanes. The lower right corner of the determination region 1002 may overlap the turning preparation position 1001. Alternatively, the determination region 1002 may have another shape. The position of the determination region 1002 with respect to the reference position may be set in advance (for example, at the time of manufacturing the vehicle 100 or at the time of updating the software) and stored in the storage unit 111. In a case where a risk position exists near the determination region 1002, the processing unit 110 may expand the determination region 1002 to include the risk position. The processing unit 110 sets the determination region 1002 to include the turning preparation position 1001 (that is, the reference position) and to be offset to the opposite lane side (the left side in the example of FIG. 10) with respect to the self-vehicle 100 in the direction orthogonal to the predicted course of the self-vehicle 100. This makes it possible to appropriately predict the possibility of the collision that may occur when the self-vehicle 100 turns left.

In step S903, the processing unit 110 (for example, the prediction unit 110*b* thereof) determines a predicted turning track 1004 of the self-vehicle 100. The predicted turning track 1004 may be a turning track predicted when the self-vehicle 100 turns (for example, left turn) to the opposite lane side. The predicted turning track 1004 may be set in advance (for example, at the time of manufacturing the vehicle 100 or at the time of updating the software) and stored in the storage unit 111. The predicted turning track 1004 thus preset may be referred to as a default predicted turning track 1004.

A plurality of candidates of the predicted turning track 1004 may be stored in the storage unit 111. The processing unit 110 (for example, the prediction unit 110*b* thereof) may select one predicted turning track 1004 from the plurality of candidates of the predicted turning track 1004 on the basis of the steering angle of the self-vehicle 100 at the turning preparation position 1001 and use the selected predicted turning track 1004 for subsequent processing. For example, in a case where the steering angle of the self-vehicle 100 is small, it is considered that the self-vehicle 100 is about to turn left at a small intersection, and thus the processing unit 110 may select the predicted turning track 1004 having a small radius of curvature. On the other hand, in a case where the steering angle of the self-vehicle 100 is large, it is considered that the self-vehicle 100 is about to turn left at a large intersection, and thus the processing unit 110 may select the predicted turning track 1004 having a large radius of curvature.

In step S904, the processing unit 110 (for example, the prediction unit 110*b* thereof) identifies the peripheral vehicle RV existing within the range 500 in front of the self-vehicle 100 as a target vehicle of the subsequent processing. If no peripheral vehicle RV exists within the range 500, no target vehicle is identified. If a plurality of peripheral vehicles RV exists within the range 500, any of the plurality of peripheral vehicles RV is identified as the target vehicle. This identification may be made on the basis of the current position of the peripheral vehicle RV included in the latest peripheral vehicle information acquired from the peripheral vehicle RV. In the example illustrated in FIG. 10, one peripheral vehicle RV exists within the range 500.

In step S905, the processing unit 110 (for example, the prediction unit 110*b* thereof) predicts the collision possibility between the self-vehicle 100 and the peripheral vehicle RV in the determination region 1002. In a case where it is determined that there is a collision possibility between the self-vehicle 100 and the peripheral vehicle RV, the processing unit 110 shifts the processing to step S906, and shifts the processing to step S908 in other cases.

The collision possibility may be determined on the basis of the fact that an intersection 1005 between the predicted turning track 1004 determined in step S903 and a predicted course 1003 of the peripheral vehicle RV is included in the determination region 1002. For example, the processing unit 110 may determine that there is a collision possibility in a case where the intersection 1005 is included in the determination region 1002, and may determine that there is no collision possibility in a case where the intersection 1005 is not included in the determination region 1002.

In step S906, the processing unit 110 (for example, the assistance unit 110*c* thereof) determines whether or not the assistance condition is satisfied. In a case where it is determined that the assistance condition is satisfied, the processing unit 110 shifts the processing to step S907, and shifts the processing to step S908 in other cases. Since step S906 may be similar to step S605, redundant description will be omitted.

In step S907, the processing unit 110 (for example, the assistance unit 110*c* thereof) performs driving assistance for the self-vehicle 100. As driving assistance for the self-vehicle 100, the processing unit 110 can notify an occupant of the self-vehicle 100 of the collision possibility by the notification device 104, and perform a braking operation of the self-vehicle 100 by the braking device 105.

In step S910, processing unit 110 (for example, the prediction unit 110*b* thereof) deletes, from the storage unit 111, the reference position and the determination region (the reference position and the determination region stored in step S603) that becomes unnecessary due to performance of the driving assistance. As a result, the capacity of the storage unit 111 is suppressed from being consumed by unnecessary information.

In a case where it is determined in step S905 that there is no collision possibility or in a case where it is determined in step S906 that the assistance condition is not satisfied, step S908 is performed. In step S908, the processing unit 110 (for example, the prediction unit 110*b* thereof) determines whether or not the self-vehicle 100 is separated from the reference position stored in step S902 by a predetermined distance (for example, 30 m) or more. In a case where it is determined that the self-vehicle 100 is separated from the reference position by the predetermined distance or more, the processing unit 110 shifts the processing to step S910, and shifts the processing to step S909 in other cases. In a case where the self-vehicle 100 is separated from the reference position by the predetermined distance or more, it is considered that there is no possibility that the self-vehicle 100 collides with a peripheral vehicle RV at that point. Therefore, the processing unit 110 ends the processing without performing driving assistance for the collision with the peripheral vehicle RV. Also in this case, in step S910, the processing unit 110 (for example, the prediction unit 110*b* thereof) deletes the unnecessary reference position and determination region from the storage unit 111.

In a case where it is determined in step S908 that the self-vehicle 100 is not separated from the reference position by the predetermined distance or more, step S909 is performed. In step S909, the processing unit 110 (for example, the prediction unit 110*b* thereof) may update the predicted turning track 1004 on the basis of the change in the steering angle of the self-vehicle 100. For example, in a case where the self-vehicle 100 turns left at a steering angle larger than that assumed by the predicted turning track 1004, the processing unit 110 may update the predicted turning track 1004 so that the radius of curvature decreases. On the other hand, in a case where the self-vehicle 100 turns left at a steering angle smaller than that assumed by the predicted turning track 1004, the processing unit 110 may update the predicted turning track 1004 so that the radius of curvature increases. The predicted turning track 1004 may be updated when the current steering angle of the self-vehicle 100 is equal to or larger than the steering angle of the default predicted turning track 1004. Thereafter, the processing unit 110 shifts the processing to step S904 to identify a peripheral vehicle RV newly included within the range 500 as a target vehicle of the subsequent processing. In addition, in step S905, the collision possibility is determined on the basis of the updated predicted turning track 1004.

According to the method of FIG. 9, in a case where a plurality of peripheral vehicles exists within the range 500 in front of the self-vehicle 100, a common reference position (that is, the turning preparation position 1001) is used for the plurality of peripheral vehicles. As a result, for each of the plurality of peripheral vehicles, a common determination region is set on the basis of the common reference position. This makes it possible to appropriately estimate the collision possibility when the self-vehicle 100 turns to the opposite lane side (for example, when turning left).

Figure 11:
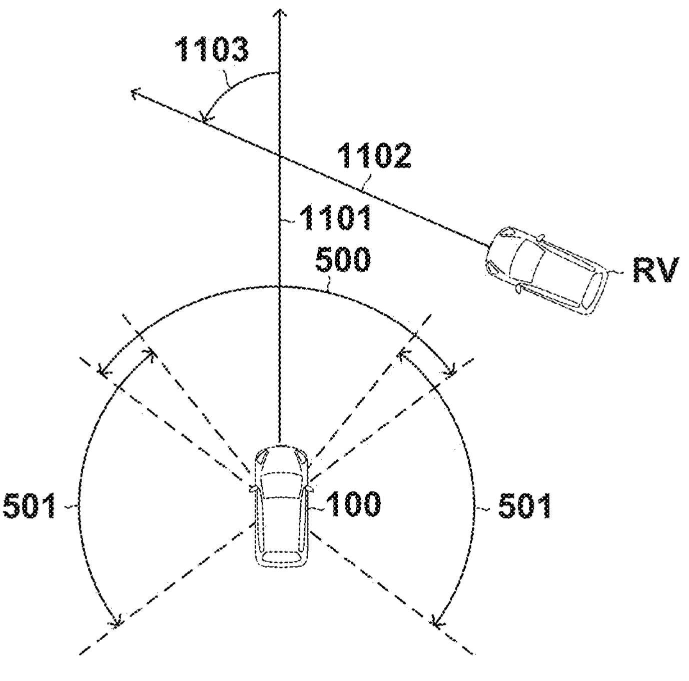
FIG. 11 is a schematic diagram for describing an example of a method of determining a peripheral vehicle to be determined according to some embodiments.

In the driving assistance method described above, on the basis of the peripheral vehicle RV being located within the range 500 or 501 of FIG. 5, the peripheral vehicle RV is set as a prediction target of the collision possibility. On the basis of other information, the processing unit 110 may determine whether or not the peripheral vehicle RV is set as a prediction target of the collision possibility. An example of a method of determining the peripheral vehicle RV to be set as a prediction target of the collision possibility will be described with reference to FIG. 11.

Further, on the basis of a rotation angle 1103 of a course vector 1102 of the peripheral vehicle RV with respect to a course vector 1101 of the self-vehicle 100, the processing unit 110 may determine whether or not the peripheral vehicle RV is set as a prediction target of the collision possibility. The course vector 1101 may also be a unit vector facing the traveling direction of a vehicle. For the sake of explanation, the rotation angle 1103 is set such that the clockwise direction is positive and the counterclockwise direction is negative. The processing unit 110 can determine the approaching direction of the peripheral vehicle RV on the basis of the direction of the peripheral vehicle RV with respect to the self-vehicle 100 and the rotation angle 1103 of the course vector 1102 of the peripheral vehicle RV with respect to the course vector 1101 of the self-vehicle 100.

Even if the peripheral vehicle RV is within the range 500 in front of the self-vehicle 100, it is considered that there is no collision possibility between the self-vehicle 100 and the peripheral vehicle RV in a case where the peripheral vehicle RV is traveling in the same direction as the self-vehicle 100 or traveling in the right direction or the left direction with respect to the self-vehicle 100. Therefore, in a case where the peripheral vehicle RV is within the range 500 in front of the self-vehicle 100 and the rotation angle 1103 is within a predetermined range (for example, 160° to) 200°, the processing unit 110 may set the peripheral vehicle RV as a determination target of the collision possibility in the processing of FIGS. 6 and 9.

Even if the peripheral vehicle RV is within the range 501 on the right side of the self-vehicle 100, it is considered that there is no collision possibility between the self-vehicle 100 and the peripheral vehicle RV in a case where the peripheral vehicle RV is traveling in the same direction as or opposite direction to the self-vehicle 100 or traveling in the right direction with respect to the self-vehicle 100. Therefore, in a case where the peripheral vehicle RV is within the range 501 on the right side of the self-vehicle 100 and the rotation angle 1103 is within a predetermined range (for example, −110° to)−70°, the processing unit 110 may set the peripheral vehicle RV as a determination target of the collision possibility in the processing of FIGS. 6 and 9.

Even if the peripheral vehicle RV is included in the range 501 on the left side of the self-vehicle 100, it is considered that there is no collision possibility between the self-vehicle 100 and the peripheral vehicle RV in a case where the peripheral vehicle RV is traveling in the same direction as or opposite direction to the self-vehicle 100 or traveling in the left direction with respect to the self-vehicle 100. Therefore, in a case where the peripheral vehicle RV is within the range 501 on the left side of the self-vehicle 100 and the rotation angle 1103 is within a predetermined range (for example, 70° to) 110°, the processing unit 110 may set the peripheral vehicle RV as a determination target of the collision possibility in the processing of FIGS. 6 and 9.

According to the above-described embodiment, the collision possibility can be appropriately predicted according to the position of the peripheral vehicle. As a result, driving assistance for the self-vehicle 100 can be appropriately performed. Note that, even in a state where driving assistance based on peripheral vehicle information acquired from a peripheral vehicle through vehicle-to-vehicle communication is not performed, driving assistance based on other criteria (for example, based on a detection result of a camera or a radar) may be performed.

Summary of Embodiments

Item 1

A driving assistance device (106) comprising:

an acquisition unit (110*a*) configured to acquire, from a peripheral vehicle (RV) existing around a self-vehicle (100) on which the driving assistance device is mounted, peripheral vehicle information indicating a vehicle speed, a position, and a traveling track of the peripheral vehicle through vehicle-to-vehicle communication;

a prediction unit (110*b*) configured to predict a collision possibility between the self-vehicle and the peripheral vehicle based on self-vehicle information indicating a vehicle speed, a position, and a traveling track of the self-vehicle and the peripheral vehicle information; and a notification unit (110*c*) configured to notify an occupant of the self-vehicle based on a prediction result by the prediction unit, wherein the prediction unit is configured to:

in a case where the peripheral vehicle exists within a first range (500) in front of the self-vehicle, set a first determination region (1002) using a position where the self-vehicle accelerates after decelerating to a threshold value or less or a position where the self-vehicle temporarily stops as a first reference position (1001), and predict a collision possibility between the self-vehicle and the peripheral vehicle in the first determination region; and in a case where the peripheral vehicle exists within a second range (501) on a side of the self-vehicle, set a second determination region (703) using an intersection between a predicted course (700) of the self-vehicle and a predicted course (701) of the peripheral vehicle as a second reference position (702), and predict a collision possibility between the self-vehicle and the peripheral vehicle in the second determination region.

According to this item, the collision possibility can be accurately predicted, and as a result, driving assistance can be appropriately provided.

Item 2

The driving assistance device according to Item 1, wherein in a case where the peripheral vehicle exists within the first range, the prediction unit predicts that there is a possibility that the self-vehicle and the peripheral vehicle collide with each other based on an intersection between a predicted turning track (1004) preset for the self-vehicle and a predicted course (1003) of the peripheral vehicle being included in the first determination region.

According to this item, the collision possibility can be more accurately predicted.

Item 3

The driving assistance device according to Item 2, wherein the prediction unit updates the predicted turning track based on a change in a steering angle of the self-vehicle.

According to this item, the collision possibility can be more accurately predicted.

Item 4

The driving assistance device according to Item 2 or 3, wherein the prediction unit selects the predicted turning track from a plurality of candidates of the predicted turning track based on a steering angle of the self-vehicle at the first reference position.

According to this item, the collision possibility can be more accurately predicted.

Item 5

The driving assistance device according to any one of Items 1-4, wherein the prediction unit sets the first determination region to include the first reference position and to be offset to an opposite lane side with respect to the self-vehicle in a direction orthogonal to a predicted course of the self-vehicle.

According to this item, the collision possibility can be more accurately predicted.

Item 6

The driving assistance device according to any one of Items 1-5, wherein the prediction unit sets the second determination region having different shape between a case where the peripheral vehicle existing within the second range is on an opposite lane side with respect to the self-vehicle and a case where the peripheral vehicle existing within the second range is on an opposite side of an opposite lane side with respect to the self-vehicle, and a length (706) of a part located closer to the self-vehicle than the second reference position in the second determination region in a case where the peripheral vehicle is on an opposite side of an opposite lane side with respect to the self-vehicle is longer than a length (706) of a part located closer to the self-vehicle than the second reference position in the second determination region in a case where the peripheral vehicle is on an opposite lane side with respect to the self-vehicle.

According to this item, the collision possibility can be more accurately predicted.

Item 7

The driving assistance device according to any one of Items 1-6, wherein in a case where the peripheral vehicle exists within the second range, and a first predicted time until the peripheral vehicle reaches the second reference position is smaller than a first time threshold value, the prediction unit predicts that there is a possibility that the self-vehicle and the peripheral vehicle collide with each other if a difference between a second predicted time until the self-vehicle reaches the second reference position and the first predicted time is smaller than a second time threshold value, and the prediction unit predicts that there is no possibility that the self-vehicle and the peripheral vehicle collide with each other if the difference between the second predicted time and the first predicted time is larger than the second time threshold value.

According to this item, the collision possibility can be more accurately predicted.

Item 8

A method for assisting driving, the method performed by a self-vehicle (100), the method comprising:

acquiring (S403), from a peripheral vehicle existing around the self-vehicle, peripheral vehicle information indicating a vehicle speed, a position, and a traveling track of the peripheral vehicle through vehicle-to-vehicle communication;

predicting (S604, S905) a collision possibility between the self-vehicle and the peripheral vehicle based on self-vehicle information indicating a vehicle speed, a position, and a traveling track of the self-vehicle and the peripheral vehicle information; and notifying (S606, S907) an occupant of the self-vehicle based on a prediction result by the prediction, wherein the predicting comprises:

in a case where the peripheral vehicle exists within a first range (500) in front of the self-vehicle, setting a first determination region (1002) using a position where the self-vehicle accelerates after decelerating to a threshold value or less or a position where the self-vehicle temporarily stops as a first reference position (1001), and predicting (S907) a collision possibility between the self-vehicle and the peripheral vehicle in the first determination region; and in a case where the peripheral vehicle exists within a second range (501) on a side of the self-vehicle, setting a second determination region (703) using an intersection between a predicted course (700) of the self-vehicle and a predicted course (701) of the peripheral vehicle as a second reference position (702), and predicting (S606) a collision possibility between the self-vehicle and the peripheral vehicle in the second determination region.

According to this item, the collision possibility can be accurately predicted, and as a result, driving assistance can be appropriately provided.

Item 9

A non-transitory storage medium configured to store a program which causes a computer mounted on a self-vehicle (100) to:

acquire (S403), from a peripheral vehicle existing around the self-vehicle, peripheral vehicle information indicating a vehicle speed, a position, and a traveling track of the peripheral vehicle through vehicle-to-vehicle communication;

predict (S604, S905) a collision possibility between the self-vehicle and the peripheral vehicle based on self-vehicle information indicating a vehicle speed, a position, and a traveling track of the self-vehicle and the peripheral vehicle information; and notify (S606, S907) an occupant of the self-vehicle based on a prediction result by the prediction, wherein the predicting comprises:

in a case where the peripheral vehicle exists within a first range (500) in front of the self-vehicle, setting a first determination region (1002) using a position where the self-vehicle accelerates after decelerating to a threshold value or less or a position where the self-vehicle temporarily stops as a first reference position (1001), and predicting (S907) a collision possibility between the self-vehicle and the peripheral vehicle in the first determination region; and in a case where the peripheral vehicle exists within a second range (501) on a side of the self-vehicle, setting a second determination region (703) using an intersection between a predicted course (700) of the self-vehicle and a predicted course (701) of the peripheral vehicle as a second reference position (702), and predicting (S606) a collision possibility between the self-vehicle and the peripheral vehicle in the second determination region.

According to this item, the collision possibility can be accurately predicted, and as a result, driving assistance can be appropriately provided.

The invention is not limited to the foregoing embodiments, and various variations/changes are possible within the spirit of the invention.

What is claimed is:

1. A driving assistance device comprising:

an acquisition unit configured to acquire, from a peripheral vehicle existing around a self-vehicle on which the driving assistance device is mounted, peripheral vehicle information indicating a vehicle speed, a position, and a traveling track of the peripheral vehicle through vehicle-to-vehicle communication;

a prediction unit configured to predict a collision possibility between the self-vehicle and the peripheral vehicle based on self-vehicle information indicating a vehicle speed, a position, and a traveling track of the self-vehicle and the peripheral vehicle information; and a notification unit configured to notify an occupant of the self-vehicle based on a prediction result by the prediction unit, wherein the prediction unit is configured to:

in a case where the peripheral vehicle exists within a first angular range in front of the self-vehicle, set a first determination region of a road to be offset to an opposite lane side with respect to the self-vehicle in a direction orthogonal to a predicted course of the self-vehicle and to include a first reference position where the self-vehicle accelerates after decelerating to a threshold value or less or where the self-vehicle temporarily stops as a first reference position, and predict a collision possibility between the self-vehicle and the peripheral vehicle in the first determination region; and in a case where the peripheral vehicle exists within a second angular range on a side of the self-vehicle, set a second determination region of the road using an intersection between a predicted course of the self-vehicle and a predicted course of the peripheral vehicle as a second reference position, and predict a collision possibility between the self-vehicle and the peripheral vehicle in the second determination region.

2. The driving assistance device according to claim 1, wherein in a case where the peripheral vehicle exists within the first angular range, the prediction unit predicts that there is a possibility that the self-vehicle and the peripheral vehicle collide with each other based on an intersection between a predicted turning track preset for the self-vehicle and a predicted course of the peripheral vehicle being included in the first determination region.

3. The driving assistance device according to claim 2, wherein the prediction unit updates the predicted turning track based on a change in a steering angle of the self-vehicle.

4. The driving assistance device according to claim 2, wherein the prediction unit selects the predicted turning track from a plurality of candidates of the predicted turning track based on a steering angle of the self-vehicle at the first reference position.

5. The driving assistance device according to claim 1, wherein the prediction unit sets the second determination region having different shape between a case where the peripheral vehicle existing within the second angular range is on an opposite lane side with respect to the self-vehicle and a case where the peripheral vehicle existing within the second angular range is on an opposite side of an opposite lane side with respect to the self-vehicle, and a length of a part located closer to the self-vehicle than the second reference position in the second determination region in a case where the peripheral vehicle is on an opposite side of an opposite lane side with respect to the self-vehicle is longer than a length of a part located closer to the self-vehicle than the second reference position in the second determination region in a case where the peripheral vehicle is on an opposite lane side with respect to the self-vehicle.

6. The driving assistance device according to claim 1, wherein in a case where the peripheral vehicle exists within the second angular range, and a first predicted time until the peripheral vehicle reaches the second reference position is smaller than a first time threshold value, the prediction unit predicts that there is a possibility that the self-vehicle and the peripheral vehicle collide with each other if a difference between a second predicted time until the self-vehicle reaches the second reference position and the first predicted time is smaller than a second time threshold value, and the prediction unit predicts that there is no possibility that the self-vehicle and the peripheral vehicle collide with each other if the difference between the second predicted time and the first predicted time is larger than the second time threshold value.

7. A method for assisting driving, the method performed by a self-vehicle, the method comprising:

acquiring, from a peripheral vehicle existing around the self-vehicle, peripheral vehicle information indicating a vehicle speed, a position, and a traveling track of the peripheral vehicle through vehicle-to-vehicle communication;

predicting a collision possibility between the self-vehicle and the peripheral vehicle based on self-vehicle information indicating a vehicle speed, a position, and a traveling track of the self-vehicle and the peripheral vehicle information; and notifying an occupant of the self-vehicle based on a prediction result by the prediction, wherein the predicting comprises:

in a case where the peripheral vehicle exists within a first angular range in front of the self-vehicle, setting a first determination region of a road to be offset to an opposite lane side with respect to the self-vehicle in a direction orthogonal to a predicted course of the self-vehicle and to include a first reference position where the self-vehicle accelerates after decelerating to a threshold value or less or where the self-vehicle temporarily stops as a first reference position, and predicting a collision possibility between the self-vehicle and the peripheral vehicle in the first determination region; and in a case where the peripheral vehicle exists within a second angular range on a side of the self-vehicle, setting a second determination region of the road using an intersection between a predicted course of the self-vehicle and a predicted course of the peripheral vehicle as a second reference position, and predicting a collision possibility between the self-vehicle and the peripheral vehicle in the second determination region.

8. A non-transitory storage medium configured to store a program which causes a computer mounted on a self-vehicle to:

acquire, from a peripheral vehicle existing around the self-vehicle, peripheral vehicle information indicating a vehicle speed, a position, and a traveling track of the peripheral vehicle through vehicle-to-vehicle communication;

predict a collision possibility between the self-vehicle and the peripheral vehicle based on self-vehicle information indicating a vehicle speed, a position, and a traveling track of the self-vehicle and the peripheral vehicle information; and notify an occupant of the self-vehicle based on a prediction result by the prediction, wherein the predicting comprises:

in a case where the peripheral vehicle exists within a first angular range in front of the self-vehicle, setting a first determination region of a road to be offset to an opposite lane side with respect to the self-vehicle in a direction orthogonal to a predicted course of the self-vehicle and to include a first reference position where the self-vehicle accelerates after decelerating to a threshold value or less or where the self-vehicle temporarily stops as a first reference position, and predicting a collision possibility between the self-vehicle and the peripheral vehicle in the first determination region; and in a case where the peripheral vehicle exists within a second angular range on a side of the self-vehicle, setting a second determination region of the road using an intersection between a predicted course of the self-vehicle and a predicted course of the peripheral vehicle as a second reference position, and predicting a collision possibility between the self-vehicle and the peripheral vehicle in the second determination region.

* * * * *